(12) United States Patent
Namba et al.

(10) Patent No.: US 7,699,457 B2
(45) Date of Patent: Apr. 20, 2010

(54) RECORDING INK, INK CARTRIDGE, INK RECORD, INKJET RECORDING APPARATUS, AND INKJET RECORDING METHOD

(75) Inventors: Michihiko Namba, Yokohama (JP); Hisashi Habashi, Isehara (JP); Akihiko Gotoh, Atsugi (JP); Kiyofumi Nagai, Machida (JP); Tomohiro Inoue, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 90 days.

(21) Appl. No.: 11/575,169

(22) PCT Filed: Sep. 13, 2005

(86) PCT No.: PCT/JP2005/017216

§ 371 (c)(1),
(2), (4) Date: Nov. 13, 2007

(87) PCT Pub. No.: WO2006/030930

PCT Pub. Date: Mar. 23, 2006

(65) Prior Publication Data

US 2008/0070008 A1    Mar. 20, 2008

(30) Foreign Application Priority Data

| Sep. 13, 2004 | (JP) | ............................ 2004-265323 |
| Sep. 14, 2004 | (JP) | ............................ 2004-267608 |
| Apr. 15, 2005 | (JP) | ............................ 2005-118488 |

(51) Int. Cl.
*C09D 11/00* (2006.01)

(52) U.S. Cl. ........................ 347/100; 106/31.13; 347/95

(58) Field of Classification Search ................. 347/100, 347/95; 106/31.13
See application file for complete search history.

(56) References Cited

U.S. PATENT DOCUMENTS

| 5,746,818 | A  | * | 5/1998 | Yatake ..................... 106/31.86 |
| 6,299,675 | B1 | * | 10/2001 | Ono et al. ................. 106/31.27 |
| 2005/0231575 | A1 | | 10/2005 | Bannai et al. |
| 2006/0234901 | A1 | * | 10/2006 | Scheuing et al. ............ 510/475 |

FOREIGN PATENT DOCUMENTS

| EP | 0 679 702 A1 | 11/1995 |
| EP | 0 882 770 A1 | 12/1998 |
| EP | 0 947 569 A1 | 10/1999 |
| EP | 1 138 729 A1 | 10/2001 |
| EP | 1 243 628 A1 | 9/2002 |
| EP | 1 493 784 | 1/2005 |
| JP | 57 90070 | 6/1982 |
| JP | 4 211478 | 8/1992 |
| JP | 5 230409 | 9/1993 |
| JP | 6 200200 | 7/1994 |
| JP | 7 314888 | 12/1995 |
| JP | 11 43639 | 2/1999 |
| JP | 2000 17207 | 1/2000 |
| JP | 2000 239590 | 9/2000 |
| JP | 2000 327968 | 11/2000 |
| JP | 2000327968 A | * 11/2000 |
| JP | 2003 3102 | 1/2003 |
| JP | 2003 191479 | 7/2003 |
| JP | 2003 238866 | 8/2003 |
| JP | 2003238866 A | * 8/2003 |
| JP | 2003 335987 | 11/2003 |
| JP | 2005 120201 | 5/2005 |
| WO | WO 03/010249 A1 | 2/2003 |

OTHER PUBLICATIONS

U.S. Appl. No. 11/575,444, filed Mar. 16, 2007, Kojima, et al.
U.S. Appl. No. 10/593,345, filed Sep. 19, 2006, Namba, et al.
U.S. Appl. No. 12/094,235, filed May 19, 2008, Namba, et al.

* cited by examiner

*Primary Examiner*—Manish S Shah
*Assistant Examiner*—Laura E Martin

(74) *Attorney, Agent, or Firm*—Oblon, Spivak, McClelland, Maier & Neustadt, L.L.P.

(57) ABSTRACT

The recording ink having a water, a water-soluble organic solvent, a colorant, and at least one fluorochemical surfactant selected from the following Structural Formulae (1) to (3). Structural Formula (1): where, Rf is a fluorine-containing group; and m, n, and p are integers in the Structural Formula (1). Structural Formula (2): where, Rf is a fluorine-containing group; X is a cationic group; Y is an anionic group; and q is an integer in the Structural Formula (2). Structural Formula (3): where, Rf is a fluorine-containing group; X is a cationic group; Y is an anionic group; and q is an integer in the Structural Formula (3).

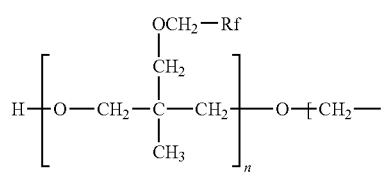

(1)

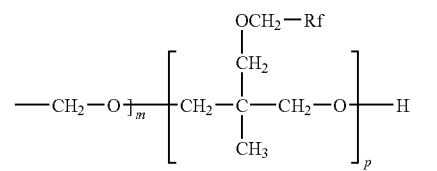

(2)

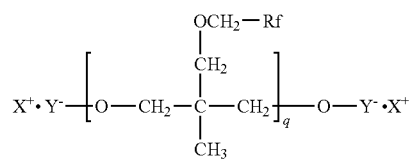

(3)

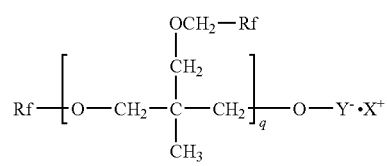

24 Claims, 6 Drawing Sheets

RECORDING INK, INK CARTRIDGE, INK RECORD, INKJET RECORDING APPARATUS, AND INKJET RECORDING METHOD

TECHNICAL FIELD

The present invention relates to a recording ink and an ink cartridge, ink record, an inkjet recording apparatus, and an inkjet recording method using the recording ink.

The present invention also relates to an inkjet recording apparatus and an inkjet recording method that realize highly reliable print recording by preventing reduction in ink-repellency caused by the elution of silicone resin from the ink-repellent is layer of a nozzle head and deterioration in discharge stability caused by changes in the nozzle shape.

BACKGROUND ART

Conventionally, an inkjet recording apparatus mainly uses aqueous ink using water-soluble dyes as colorants. However, the dye ink has disadvantages such as poor weather-resistance and poor water-resistance.

Recently, much research has focused on pigment ink that uses pigments in place of water-soluble dyes, and some pigment ink is commercially available. However, pigment ink still has many problems with color development and stability in comparison with dye ink. Particularly, according to technical improvement in OA printers for higher image quality, pigment ink is required to have print quality, hue, color saturation, gloss, and storage stability equal to dye ink on regular papers.

For example, inkjet printing ink is proposed as a low surface tension aqueous pigment ink having a stable ink discharge and improved ink wettability, in which a water-soluble organic solvent, colorants, water, and perfluoroalkylsulfonate are added (see Patent Literature 1). A variety of other ink compositions using fluorochemical surfactants have also been proposed (see Patent Literatures 2, 3, and 4).

However, these proposed compositions all have problems such as poor pigment dispersion stability and poor fixing properties and color development on recording media when the colorants are pigments. Generally, in low surface tension aqueous ink having improved ink wettability, the ink has high foaming properties and easily foams under the influence of surfactants used in the ink, which adversely affects the filling and stable discharge of the ink.

As for color development, C.I. Pigment Red 122 and C.I. Pigment Blue 15:3 are generally used for the pigment ink in magenta and cyan colors, respectively, and have different color reproduction ranges in comparison with dye ink. Toning is used to reduce hue errors. However, reduction in color saturation is inevitable and problems with print quality occur in such a case.

On the other hand, pigments themselves have been modified to change their hue without toning. For example, cyan pigments having hue in the same range as cyan dyes have been proposed in Patent Literature 5 where phthalocyanine pigment having a specific crystalline structure is used. However, they do not satisfy all properties including the problem of cost.

On the other hand, many inkjet recording inks have been proposed in which an ink set comprising pigments as black ink materials and dyes as yellow, magenta, and cyan color ink materials is used (see Patent Literature 6). However, in these proposals, sufficient regular paper properties in printing on regular paper have not been achieved.

According to technical improvements in OA printers for higher image quality, there is an increasing demand in relation to quality, hue, color saturation, and gloss. Particularly, there is an increasing demand for image quality with regard to pigment ink.

Subsequently, a technique is proposed in which a fluorochemical surfactant is contained in the pigment ink to improve wettability on paper, thereby improving color development (see Patent Literature 7). An attempt is made to use silicone resin as the ink-repellent layer of a nozzle head in order to use a fluorochemical surfactant-containing pigment ink having improved wettability.

These proposed techniques allow for improvement in color development of the pigment ink. However, the silicone resin layer as the ink-repellent layer of a nozzle head problematically deteriorates as a result of the elution of its components after it makes contact with the fluorochemical surfactant containing ink.

Therefore, the silicone resin layer is made thicker to ensure ink-repellency even after the components elute from the silicone resin layer of the nozzle head to a certain extent. However, sufficient achievement has not been observed. When the silicone resin layer of the nozzle head is made thicker, it becomes difficult to produce nozzle heads with uniform quality, and it is still difficult to sufficiently function as a nozzle surface (such as stable discharge and cleaning ability).

Hence, there is a high demand for the early providing of a recording ink having improved color development properties ensuring highly stable discharge and excellently uniform solid image parts, and consequently, improved color saturation to form high quality images and, an ink cartridge, ink record, an inkjet recording apparatus, and an inkjet recording method, all using the recording ink.

Patent Literature 1 Japanese Patent Application Laid-Open (JP-A) No. 57-90070

Patent Literature 2 Japanese Patent Application Laid-Open (JP-A) No. 4-211478

Patent Literature 3 Japanese Patent Application Laid-Open (JP-A) No. 5-230409

Patent Literature 4 Japanese Patent Application Laid-Open (JP-A) No. 6-200200

Patent Literature 5 Japanese Patent Application Laid-Open (JP-A) No. 2000-17207

Patent Literature 6 Japanese Patent Application Laid-Open (JP-A) No. 2000-239590

Patent Literature 7 Japanese Patent Application Laid-Open (JP-A) No. 2003-335987

DISCLOSURE OF INVENTION

The first purpose of the present invention is to provide a recording ink having improved color development properties ensuring highly stable discharge and excellently uniform solid image parts, and consequently, improved color saturation to form high quality images and, an ink cartridge, ink record, an inkjet recording apparatus, and an inkjet recording method, all using the recording ink.

The second purpose of the present invention is to provide an inkjet recording apparatus and an inkjet recording method using a fluorochemical surfactant-containing ink having improved color development in which reduction in ink-repellency caused by the elution of silicone resin from the ink-repellent layer of the nozzle head is prevented and deterioration in discharge stability caused by changes in the nozzle shape is suppressed, thereby realizing highly reliable print recording.

The recording ink of the present invention contains at least water, a water-soluble organic solvent, a colorant, and at least one fluorochemical surfactant selected from the following Structural Formulae (1) to (3).

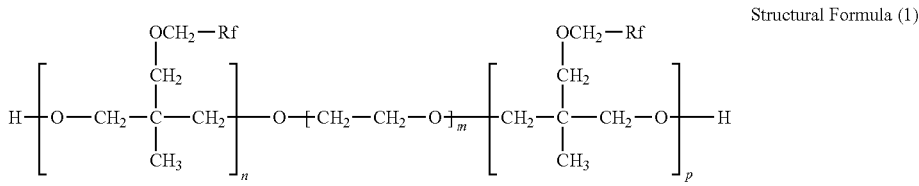

Structural Formula (1)

where, Rf is a fluorine-containing group; and m, n, and p are integers in the Structural Formula (1).

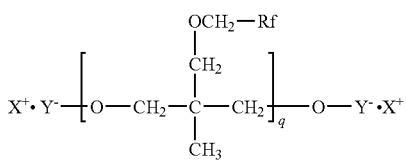

Structural Formula (2)

where, Rf is a fluorine-containing group; X is a cationic group; Y is an anionic group; and q is an integer in the Structural Formula (2).

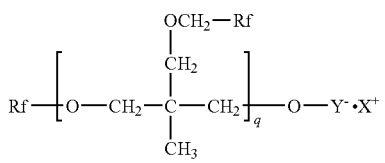

Structural Formula (3)

where, Rf is a fluorine-containing group; X is a cationic group; Y is an anionic group; and q is an integer in the Structural Formula (3).

According to the recording ink of the present invention, an ink using an aqueous dispersion of polymer fine-particles containing color materials (coloring fine-particles) as a colorant, a water-soluble organic solvent, and a fluorochemical surfactant having a specific chemical structure selected from the Structural Formulae (1) to (3) above is characterized by the fact that the ink has a lower surface tension than the prior art ink in spite of a higher viscosity and, therefore, the vehicle rapidly infiltrates into regular papers and the color material components easily remain on the surface during printing. In addition, using the fluorochemical surfactant prevents the color materials from being unevenly distributed, encouraging them to evenly appear on the paper surface and, further, remarkably improving the dye-affinity to the paper. Consequently, highly saturated and intensely developed images having less strike-through can be obtained. Using an ink set comprising a black ink and color inks in which the color inks contains pigment inks as color material in the ink having the coloring fine-particles-containing structure and the black ink contains a self-dispersible carbon black as a color material and has a high viscosity/a low surface tension similarly to the color inks, high quality images having high black concentrations, little run at the black-color borders, remarkably improved color saturation resulting from the fluorochemical surfactant having a specific structure, and less strike-through for double face printing can be obtained.

It is preferable in the recording ink of the present invention that Rf in the above Structural Formulae (1) to (3) be the perfluoroalkyl group and that the fluorochemical surfactant be at least one selected from the following Structural Formulae (1-1) to (3-1).

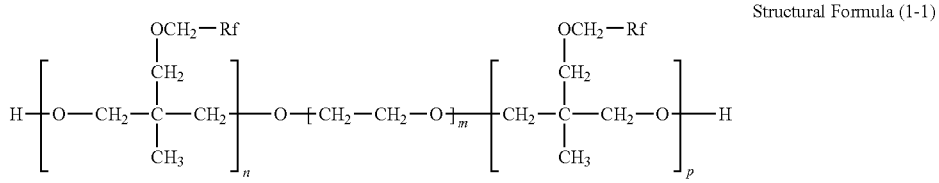

Structural Formula (1-1)

where, Rf is $CF_3$ or $CF_2CF_3$; and n is 1 to 4, m is 6 to 25, and p is 1 to 4.

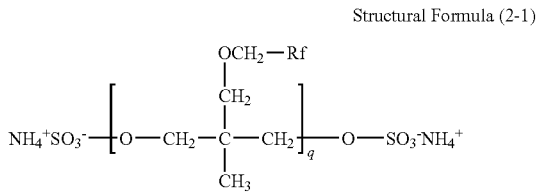

Structural Formula (2-1)

where, Rf is $CF_3$ or $CF_2CF_3$; and q is 1 to 6.

Structural Formula (3-1)

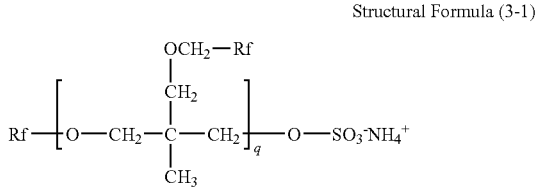

where, Rf is $CF_3$ or $CF_2CF_3$; and q is 1 to 6.

It is preferable in the recording ink of the present invention that the content of at least one fluorochemical surfactant selected from the Structural Formulae (1) to (3) be 0.01% by mass to 10% by mass, that the colorant be at least one of pigments, dyes, and coloring fine-particles, the pigment has at least one hydrophilic group on the surface, is at least one of water-dispersible and water-soluble in the absence of dispersant, that the water-soluble organic solvent is at least one selected from glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone and N-hydroxyethyl-2-pyrrolidone, and at least one selected from cyan ink, magenta ink, yellow ink, and black ink.

The ink cartridge of the present invention comprises a container containing the recording ink of the present invention. The ink cartridge of the present invention is preferably used in inkjet recording system printers. By recording with the ink contained in the ink cartridge, improved color development, highly stable discharge, and excellently uniform solid image parts are achieved, thereby forming high quality images.

The first embodiment of the inkjet recording apparatus of the present invention at least comprises an ink drops discharging unit configured to discharge the recording ink drops to form an image by applying impulse to the recording ink The same head of the ink drops discharging unit is used for dye ink and pigment ink that are appropriately switched.

In the first embodiment of the inkjet recording apparatus, the ink drops discharging unit configured to discharge the recording ink drops to form an image by applying impulse to the recording ink. Consequently, improved color development, highly stable discharge, and excellently uniform solid image parts are achieved, thereby forming high quality images.

It is preferable in the first embodiment of the inkjet recording apparatus of the present invention that the impulse be at least one selected from heat, pressure, vibration, and light.

The second embodiment of the inkjet recording apparatus of the present invention at least comprises an ink drops discharging unit configured to discharge the recording ink drops to form an image by applying the impulse to the recording ink. The ink drops discharging unit comprises a nozzle head portion having a silicone resin-containing ink-repellent layer on the ink discharging surface. The ink used in this inkjet recording apparatus contains at least water, a colorant, a fluorochemical surfactant, and an aminopropanediol compound.

In the second embodiment of the inkjet recording apparatus, reduction in ink-repellency caused by elution of silicone resin from the ink-repellent layer of the nozzle head is prevented and deterioration in discharge stability caused by changes in the nozzle shape is suppressed, thereby highly reliable print recording can be realized.

It is preferable in the second embodiment of the inkjet apparatus that the aminopropanediol compound is 2-amino-2-ethyl-1,3-propanediol, the content of the aminopropanediol compound in the ink is 0.01% by mass to 10% by mass, and the fluorochemical surfactant is at least one selected from the following Structural Formulae (A), (1), (2) and (3).

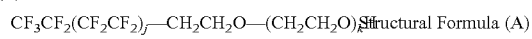

Structural Formula (A)

where, j and k are integers in the Structural Formula (A).

Structural Formula (1)

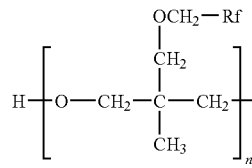

where, Rf is a fluorine-containing group; and m, n, and p are integers in the Structural Formula (1).

Structural Formula (2)

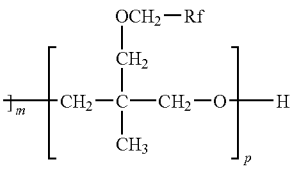

where, Rf is a fluorine-containing group; X is a cationic group; Y is an anionic group; and q is an integer in the Structural Formula (2).

Structural Formula (3)

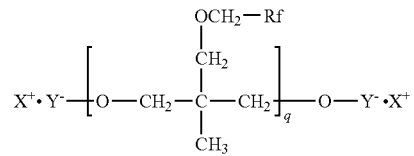

where, Rf is a fluorine-containing group; X is a cationic group; Y is an anionic group; and q is an integer in the Structural Formula (3).

It is preferable in the second embodiment of the inkjet apparatus that the content of the fluorochemical surfactant in the ink be 0.05% by mass to 20% by mass, that the colorant be at least one of pigments, dyes, and coloring fine-particles, that the pigment has at least one hydrophilic group on the surface and be at least one of water-dispersible and water-soluble in the absence of dispersant, and that the impulse be one selected from heat, pressure, vibration, and light.

The first embodiment of the inkjet recording method of the present invention at least comprises an ink drops discharging unit configured to discharge the recording ink drops to form an image by applying the impulse to the recording ink of the present invention. Using the first embodiment of the inkjet recording method, improved color development, highly stable discharge, and excellently uniform solid image parts are achieved, thereby high quality images can be formed.

It is preferable in the first embodiment of the inkjet recording method of the present invention that the impulse be at least one selected from heat, pressure, vibration, and light.

The second embodiment of the inkjet recording method of the present invention at least comprises an ink drops discharging unit configured to discharge the recording ink drops to form an image by applying impulse to the recording ink. The ink drops discharging step is performed using a nozzle head having a silicone resin-containing ink-repellent layer on the ink discharging surface. The ink used in the inkjet recording method contains at least water, a colorant, a fluorochemical surfactant, and an aminopropanediol compound.

Using the second embodiment of the inkjet recording method, reduction in ink-repellency caused by elution of silicone resin from the ink-repellent layer of the nozzle head is prevented and deterioration in discharge stability caused by changes in the nozzle shape is suppressed, thereby realizing highly reliable print recording.

It is preferable in the second embodiment of the inkjet recording method that the aminopropanediol compound be 2-amino-2-ethyl-1,3-propanediol, that the fluorochemical surfactant be at least one selected from the following Structural Formulae (A), (1), (2) and (3), and that the impulse be at least one selected from heat, pressure, vibration, and light.

$$CF_3CF_2(CF_2CF_2)_j\text{---}CH_2CH_2O(CH_2CH_2O)_kH \quad \text{Structural Formula (A)}$$

where, j and k are integers in the Structural Formula (A).

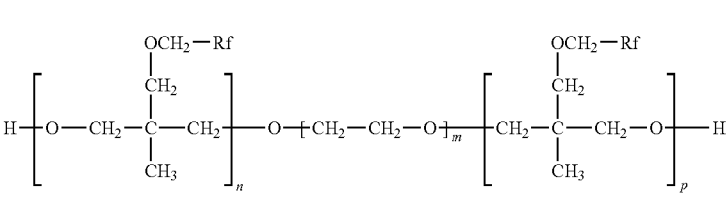

where, Rf is a fluorine-containing group; and m, n, and p are integers in the Structural Formula (1).

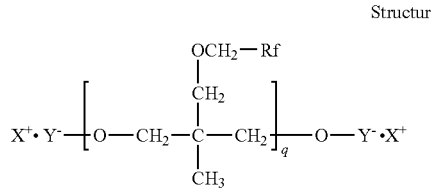

Structural Formula (2)

where, Rf is a fluorine-containing group; X is a cationic group; Y is an anionic group; and q is an integer in the Structural Formula (2).

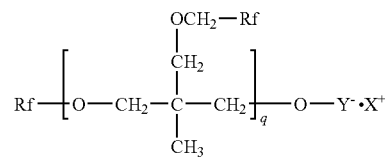

Structural Formula (3)

where, Rf is a fluorine-containing group; X is a cationic group; Y is an anionic group; and q is an integer in the Structural Formula (3).

The ink record of the present invention comprises images formed using the recording ink of the present invention. In the inkjet record, improved color development, highly stable discharge, and excellently uniform solid image parts are achieved, by which high quality images can be retained on the recording media.

Figure 1:
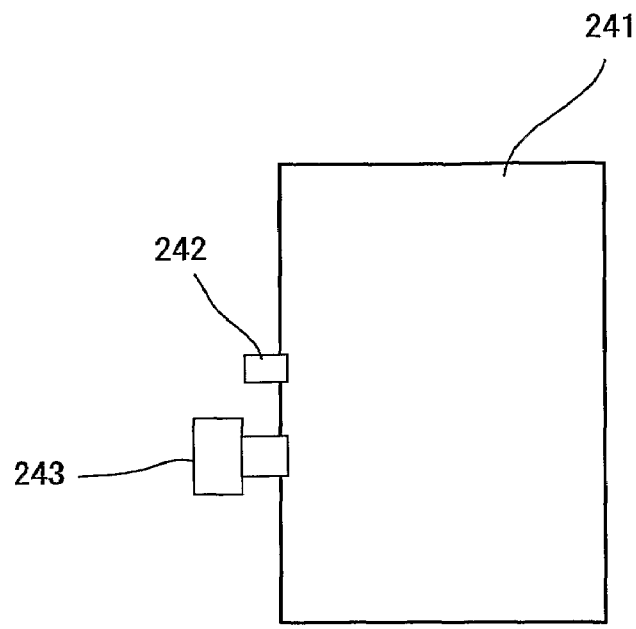
FIG. 1 is a schematic illustration an example of the ink cartridge of the present invention.

BEST MODE FOR CARRYING OUT THE INVENTION (Recording Ink)

The recording ink of the present invention contains at least water, a water-soluble organic solvent, a colorant, and a fluorochemical surfactant having a specific chemical structure and, where necessary, further contains other components.

The fluorochemical surfactant having a specific chemical structure is at least one selected from the following Structural Formulae (1) to (3).

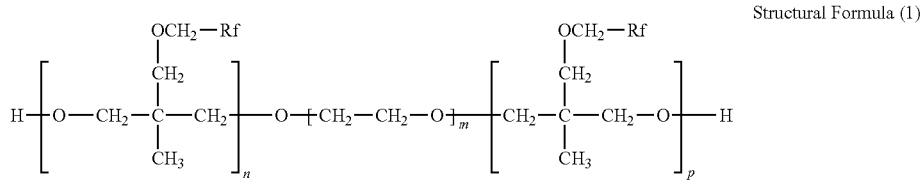

Structural Formula (1)

In the Structural Formula (1), Rf is a fluorine-containing group and, in particular, preferably a perfluoroalykyl group.

The perfluoroalkyl group is preferably those having a carbon number from 1 to 10, more preferably from 1 to 3, such as $-C_nF_{2n-1}$ (where, n is an integer of 1 to 10). Examples of the perfluoroalkyl group include $-CF_3$, $-CF_2CF_3$, $-C_3F_7$, and $-C_4F_9$. Among them, $-CF_3$ and $-CF_2CF_3$ are particularly preferable.

m, n, and p are integers. Preferably, n is an integer of 1 to 4, m is an integer of 6 to 25, and p is an integer of 1 to 4.

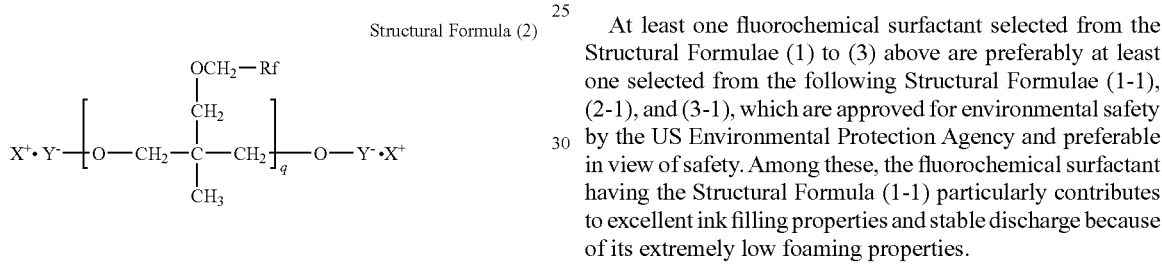

Structural Formula (2)

In the Structural Formula (2), Rf is a fluorine-containing group, preferably a perfluoroalkyl group as in the Structural Formula (1) such as $-CF_3$, $-CF_2CF_3$, $-C_3F_7$, and $-C_4F_9$.

X is a cationic group such as quaternary ammonium groups; alkali metal such as sodium and potassium; and triethylamine and triethanolamine. Among them, quaternary ammonium groups are particularly preferable.

Y is an anionic group such as $COO$, $SO^3$, $SO^4$, and $PO^4$.
q is an integer, for example, preferably of 1 to 6.

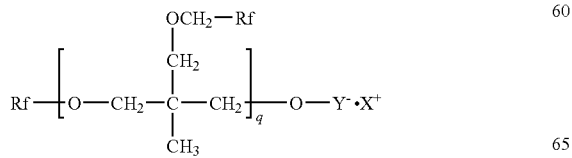

Structural Formula (3)

In the Structural Formula (3), Rf is a fluorine-containing group, preferably a perfluoroalkyl group as in the Structural Formula (1) such as $-CF_3$, $-CF_2CF_3$, $-C_3F_7$, and $-C_4F_9$.

X is a cationic group such as quaternary ammonium groups; alkali metal such as sodium and potassium; and triethylamine and triethanolamine. Among these, quaternary ammonium groups are particularly preferable.

Y is an anionic group such as $COO$, $SO_3$, $SO_4$, and $PO_4$.
q is an integer, for example, preferably of 1 to 6.

At least one fluorochemical surfactant selected from the Structural Formulae (1) to (3) above are preferably at least one selected from the following Structural Formulae (1-1), (2-1), and (3-1), which are approved for environmental safety by the US Environmental Protection Agency and preferable in view of safety. Among these, the fluorochemical surfactant having the Structural Formula (1-1) particularly contributes to excellent ink filling properties and stable discharge because of its extremely low foaming properties.

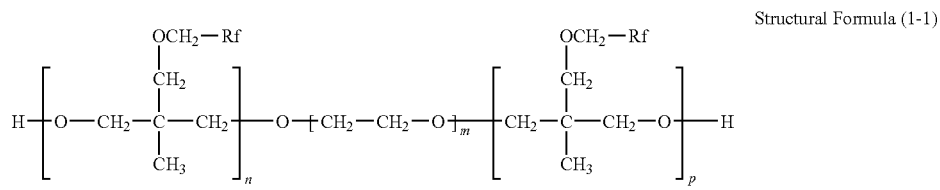

Structural Formula (1-1)

where, Rf is $CF_3$ or $CF_2CF_3$; and n is 1 to 4, m is 6 to 25, and p is of 1 to 4.

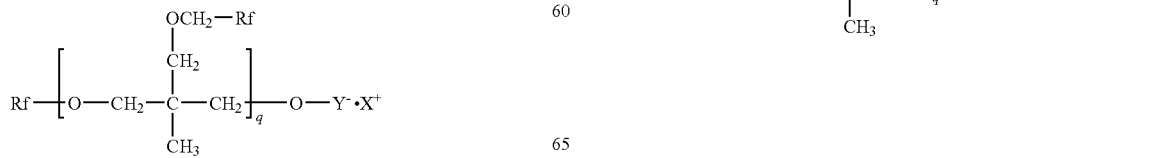

Structural Formula (2-1)

where, Rf is $CF_3$ or $CF_2CF_3$; and q is 1 to 6.

Structural Formula (3-1)

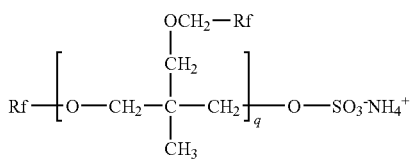

where, Rf is $CF_3$ or $CF_2CF_3$; and q is 1 to 6.

The content of at least one fluorochemical surfactant selected from the Structural Formulae (1) to (3) in the recording ink is preferably 0.01% by mass to 10% by mass, more preferably 0.1% by mass to 5% by mass. When the content of the fluorochemical surfactant is lower than 0.01% by mass, improved color development may not be obtained. When it is higher than 10% by mass, the ink may have deteriorated storage stability.

The recording ink of the present invention can contain at least one fluorochemical surfactant selected from the Structural Formulae (1) to (3) individually or in combination of two or more. Further, the fluorochemical surfactant having the Structural Formula (1), the fluorochemical surfactant having the Structural Formula (2), and the fluorochemical surfactant having the Structural Formula (3) can be used in combination. However, other fluorochemical, nonionic, anionic, amphoteric, and acetylene glycol surfactants can be additionally used.

Examples of the anionic surfactant include alkylallyl, alkylnaphthalenesulfonate, alkylphosphate, alkylsulfate, alkylsulfonate, alkylethersulfate, alkylsulfosuccinate, alkylestersulfate, alkylbenzenesulfonate, alkyldiphenyletherdisulfonate, alkylaryletherphosphate, alkylarylethersulfate, alkylaryletherestersulfate, olefinsulfonate, alkaneolefinsulfonate, polyoxyethylenealkyletherphosphate, polyoxyethylenealkylethersulfic ester salt, ethercarboxylate, sulfosuccinate, α-sulfo fatty acid ester, fatty acid salt, condensates of higher fatty acid and amino acid, and naphthenate.

Examples of the nonionic surfactant include polyoxyethylenealkylether, polyoxyethylenealkylallyether, polyoxyethylenealkylphenylether, polyoxyethylene glycol ester, polyoxyethylenefatty acid amide, polyoxyethylenefatty acid ester, polyoxyethylenepolyoxypropylene glycol, glycerin ester, sorbitan ester, sucrose ester, polyoxyethylene ether of glycerin ester, polyoxyethylene ether of sorbitan ester, polyoxyethylene ether of sorbitol ester, fatty acid alkanol amide, amine oxide, polyoxyethylenealkylamine, glycerin fatty acid ester, sorbitan fatty acid ester, polyoxyethylenesorbitan fatty acid ester, polyoxyethylenesorbitol fatty acid ester, and alkyl (poly)glycoxide.

Examples of the amphoteric surfactant include imidazoline derivatives such as imidazolium betaine, dimethylalkyllauryl betaine, alkylglycine, alkyldi(aminoethyl)glycine.

Examples of the acetylene glycol surfactant include acetylene glycols such as 2,4,7,9-tetramethyl-5-decyn-4,7-diol, 3,6-dimethyl-4-octyn-3,6-diol, 3,5-dimethyl-1-hexyn-3-ol (for example, Surfynol 104, 82, 465, 485 or TG, by Air Products (the US)).

The addition rate of the surfactants can be appropriately adjusted as long as the purpose and efficacy of the present invention is not impaired.

—Colorant—

The colorant can be any one of pigments, dyes, and coloring fine-particles.

An aqueous dispersion of polymer fine-particles containing coloring materials is preferably used as the coloring fine-particles.

Here, the "containing coloring materials" means either one or both of the state that coloring materials are sealed in polymer fine-particles and the state that coloring materials are adsorbed to the surface of polymer fine-particles. All coloring materials mixed in the recording ink of the present invention are not necessarily sealed in or adhered to polymer fine-particles. The coloring materials can be dispersed in the emulsion as long as the efficacy of the present invention is not impaired. The coloring materials are not particularly limited and may be appropriately selected according to the purpose as long as they are insoluble or hardly soluble in water and can be adhered to the polymer.

Here, the "insoluble or hardly soluble in water" means that 10 parts by mass or more of coloring materials are not dissolved in 100 parts by mass of water at 20° C. Further, "soluble" means that separated or precipitated coloring materials are not visible at the surface or bottom of an aqueous solution.

The average particle diameter of the polymer fine-particles containing coloring materials (coloring fine-particles) in the ink is preferably 0.16 μm or smaller.

The content of the coloring fine-particles in the recording ink is, by solid content, preferably 8% by mass to 20% by mass, more preferably 8% by mass to 12% by mass.

The colorant can be dyes, such as water-soluble, oil-soluble, and disperse dyes, and pigments. Oil-soluble and disperse dyes are preferable in view of excellent adsorption and sealable properties. However, pigments are preferably used in view of light stability of obtained images.

The dyes are preferably dissolved in an organic solvent such as a ketone solvent at a rate of 2 g/L or higher, more preferably at a rate of 20 g/L to 600 g/L, in view of efficient impregnation into polymer fine-particles.

Water-soluble dye can be those classified as acidic, direct, basic, reactive, and food dyes in the color index and preferably has excellent water resistance and light stability.

Examples of the acidic and food dyes include C.I. Acid Yellow 17, 23, 42, 44, 79, 142; C.I. Acid Red 1, 8, 13, 14, 18, 26, 27, 35, 37, 42, 52, 82, 87, 89, 92, 97, 106, 111, 114, 115, 134, 186, 249, 254, 289; C.I. Acid Blue 9, 29, 45, 92, 249; C.I. Acid Black 1, 2, 7, 24, 26, 94; C.I. Food Yellow 3, 4; C.I. Food Red 7, 9, 14; C.I. Food Black 1, 2, and the like.

Examples of the Direct dye include C.I. Direct Yellow 1, 12, 24, 26, 33, 44, 50, 86, 120, 132, 142, 144; C.I. Direct Red 1, 4, 9, 13, 17, 20, 28, 31, 39, 80, 81, 83, 89, 225, 227; C.I. Direct Orange 26, 29, 62, 102; C.I. Direct Blue 1, 2, 6, 15, 22, 25, 71, 76, 79, 86, 87, 90, 98, 163, 165, 199, 202; C.I. Direct Black 19, 22, 32, 38, 51, 56, 71, 74, 75, 77, 154, 168, 171, and the like.

Examples of the Basic dye include C.I. Basic Yellow 1, 2, 11, 13, 14, 15, 19, 21, 23, 24, 25, 28, 29, 32, 36, 40, 41, 45, 51, 53, 63, 64, 65, 67, 70, 73, 77, 87, 91; C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112; C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; C.I. Basic Black 2, 8, and the like.

Examples of the reactive dye include C.I. Reactive Black 3, 4, 7, 11, 12, 17; C.I. Reactive Yellow 1, 5, 11, 13, 14, 20, 21, 22, 25, 40, 47, 51, 55, 65, 67; C.I. Reactive Red 1, 14, 17, 25, 26, 32, 37, 44, 46, 55, 60, 66, 74, 79, 96, 97; C.I. Reactive Blue 1, 2, 7, 14, 15, 23, 32, 35, 38, 41, 63, 80, 95, and the like.

The pigments are not particularly limited and may be appropriately selected according to the purpose. The pigments can be, for example, either inorganic or organic.

Examples of the inorganic pigments include titanium oxide, iron oxide, calcium carbonate, barium sulfate, aluminum hydroxide, barium yellow, cadmium red, chrome yellow, and carbon black. Among them, carbon black is preferable. Examples of the carbon black include those produced by known methods such as contact, furnace, and thermal methods, and the like.

Examples of the organic pigments include azo pigments, polycyclic pigments, dye chelates, nitro pigments, nitroso pigments, and aniline black. Among them, azo pigments and polycyclic pigments are preferable. Examples of the azo pigments include azo lake, insoluble azo pigments, condensed azo pigments, and chelate azo pigments. Examples of the polycyclic pigments include phthalocyanine pigments, perylene pigments, perynone pigments, anthraquinone pigments, quinacridone pigments, dioxane pigments, indigo pigments, thioindigo pigments, isoindolinone pigments, and quinofuraron pigments. Examples of the dye chelates include basic dye chelates and acidic dye chelates, and the like.

The pigments are not particularly limited in color and may be appropriately selected according to the purpose. For example, black or color pigments can be used. They can be used individually or in combination of two or more.

Examples of the black pigments include carbon blacks (C.I. Pigment Black 7), such as furnace black, lampblack, acetylene black, and channel black, metals such as copper, iron (C.I. Pigment Black 11), and titanium oxide, and organic pigments such as aniline black (C.I. Pigment Black 1), and the like.

Among the color pigments, examples of yellow pigments include C.I. Pigment Yellow 1 (fast yellow G), 3, 12 (disazo yellow AAA), 13, 14, 17, 23, 24, 34, 35, 37, 42 (yellow iron oxide), 53, 55, 74, 81, 83 (disazo yellow HR), 95, 97, 98, 100, 101, 104, 108, 109, 110, 117, 120, 128, 138, 150, and 153, and the like.

Examples of magenta pigments include C.I. Pigment Red 1, 2, 3, 5, 17, 22 (brilliant fast scarlet), 23, 31, 38, 48:2 (permanent red 2B (Ba)), 48:2 (permanent red 2B (Ca)), 48:3 (permanent red 2B (Sr)), 48:4 (permanent red 2B (Mn)), 49:1, 52:2, 53:1, 57:1 (brilliant carmine 6B), 60:1, 63:1, 63:2, 64:1, 81 (rhodamine 6G lake), 83, 88, 92, 101 (colcothar), 104, 105, 106, 108 (cadmium red), 112, 114, 122 (dimethylquinacridone), 123, 146, 149, 166, 168, 170, 172, 177, 178, 179, 185, 190, 193, 209, and 219, and the like.

Examples of cyan pigments include C.I. Pigment Blue 1, 2, 15 (copper phthalocyanine blue R), 15:1, 15:2, 15:3 (phthalocyanine blue G), 15:4, 15:6 (phthalocyanine blue E), 16, 17:1, 56, 60, and 63, and the like.

Examples of intermediate color, red, green, and blue, pigments include C.I. Pigment Red 177, 194, 224, C.I. Pigment Orange 43, C.I. Pigment Violet 3, 19, 23, 37, and C.I. Pigment Green 7, 36, and the like.

Among the pigments, self-dispersible color pigments that have at least one hydrophilic group bound to the pigment surface directly or via another atomic group and are stably dispersed in the absence of dispersant are preferably used. Consequently, a dispersant for dispersing the pigments, which is required in the prior art ink, is unnecessary. Among the self-dispersible color pigments, ionic self-dispersible color pigments are preferable. Anionic or cationic self-dispersible color pigments are preferable.

Examples of the anionic hydrophilic group include —COOM, —SO$_3$M, —PO$_3$HM, —PO$_3$M$_2$, —SO$_2$NH$_2$, and —SO$_2$NHCOR (in which M is a hydrogen atom, alkali metal, ammonium, or organic ammonium; R is an alkyl group having 1 to 12 carbon atoms, a phenyl group that may have a substituent, or a naphthyl group that may have a substituent). Among them, color pigments having —COOM or —SO$_3$M bound to the surface are preferably used.

Examples of the alkali metal "M" in the hydrophilic group include lithium, sodium, and potassium. Examples of the organic ammonium include mono- or tri-methylammonium, mono- or tri-ethylammonium, and mono- or tri-methanolammonium. Among the anionic color pigments, a color pigment having —COONa bound to the surface can be obtained for example by oxidizing a color pigment with sodium hypochlorite, sulfonating, or reacting diazonium salt.

The cationic hydrophilic groups are, for example, preferably quaternary ammonium groups, more preferably the following quaternary ammonium groups. The pigments having any of these bound to the surface are preferable color materials.

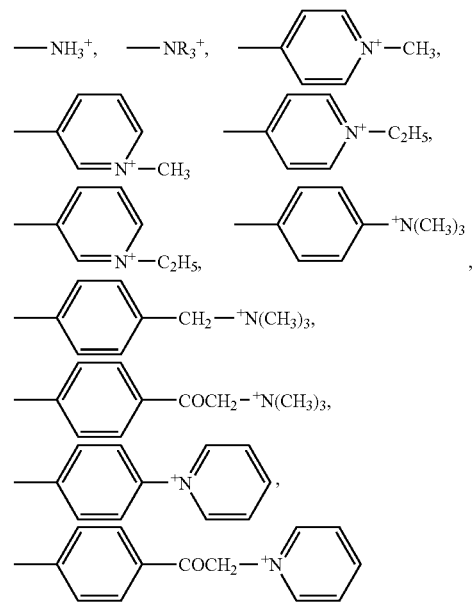

The cationic self-dispersible carbon black having a hydrophilic group can be obtained for example by treating carbon black with 3-amino-N-ethylpyridium bromide to bind an N-ethylpyridyl group having the following Structural Formula. Needless to say, the present invention is not limited thereto.

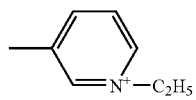

The hydrophilic group can be bound to the carbon black surface via another atomic group in the present invention. Examples of the atomic group include an alkyl group having 1 to 12 carbon atoms, a phenyl group that may have a substituent, or a naphthyl group that may have a substituent. Examples of the hydrophilic group bound to the carbon black surface via another atomic group include —C$_2$H$_4$COOM (in which M is an alkali metal or a quaternary ammonium), -PhSO$_3$M (in which Ph is a phenyl group; and M is an alkali metal or a quaternary ammonium), and —$C_5H_{10}NH_3^+$. Needless to say, the present invention is not limited thereto.

Pigment dispersion using a pigment dispersant can be used in the present invention.

Examples of natural pigment dispersants among the pigment dispersant as the hydrophilic polymers include plant polymers such as acacia gum, tragacanth gum, guar gum, karaya gum, locust bean gum, arabinogalactone, pectin, and quinceseed starch, seaweed polymers such as alginic acid, carrageenfan, and agar, animal polymers such as gelatin, casein, albumin, and collagen, and microorganism polymers such as xanthein gum and dextran. Examples of semi-synthetic pigment dispersant include fibrous polymers such as methylcellulose, ethylcellulose, hydroxyethylcellulose, hydroxypropylcellulose, and carboxymethylcellulose, starch polymers such as sodium carboxymethyl starch and sodium phosphate ester starch, and seaweed polymers such as sodium alginate and propylene glycol alginate ester. Examples of pure synthetic pigment dispersant include vinyl polymers such as polyvinyl alcohol, polyvinylpyrrolidone, and polyvinylmethyl ether, uncrosslinked polyacrylamide, polyacrylic acid and alkali metal salts thereof, acrylic resin such as water-soluble styreneacrylic resin, water-soluble styrenemaleic acid resin, water-soluble vinylnaphthaleneacrylic resin, water-soluble vinylnaphthalene maleic resin, polyvinylpyrrolidone, polyvinyl alcohol, alkali metal salt of β-naphthalenesulfonic acid formarine condensate, polymers having a salt of a cationic functional group such as a quaternary ammonium and an amino group on the side chain, and natural polymer compounds such as shellac. Among them, those having a carboxylic acid group such as homopolymers of acrylic acid, methacrylic acid, and styreneacrylic acid and copolymers of monomers having other hydrophilic groups are particularly preferable polymer dispersants.

These copolymers preferably have a mass average molecular mass of 3,000 to 50,000, more preferably 5,000 to 30,000, and further preferably 7,000 to 15,000.

The mixture rate by mass of pigment to dispersant is preferably 1:0.06 to 1:3, more preferably 1:0.125 to 1:3.

Resin fine-particles can be used in the present invention.

The resin fine-particles are not particularly limited and may be appropriately selected according to the purpose. Preferable examples of the resin fine-particles include silicone modified acrylic resin obtained by polymerizing an acrylic monomer and a silane compound in the presence of emulsifier.

The acrylic monomer is not particularly limited and may be appropriately selected according to the purpose. Examples of the acrylic monomer include acrylic ester monomers, methacrylic ester monomers, amide acrylates, carboxylic acid-containing monomers, and the like.

Examples of the acrylic ester monomers include methyl acrylate, ethyl acrylate, butyl acrylate, 2-ethylhexyl acrylate, 2-hydroxyethyl acrylate, acryloyl morpholine, and N,N'-dimethylaminoethylacrylate, and the like.

Examples of the methacrylic ester monomers include methyl methacrylate, ethyl methacrylate, butyl methacrylate, 2-ethylhexyl methacrylate, 2-hydroxyethyl methacrylate, N,N'-dimethylaminoethyl methacrylate, and the like.

Examples of the amide acrylates include N-methylolacrylamide and methoxymethylacrylamide, and the like.

Examples of the carboxylic acid-containing monomers include maleic acid, fumaric acid, itaconic acid, acrylic acid, and methacrylic acid, and the like.

The silane compound is not particularly limited and may be appropriately selected according to the purpose. Examples of the silane compound include tetramethoxysilane, methyltrimethoxysilane, dimethyldimethoxysilane, phenyltrimethoxysilane, diphenyldimethoxysilane, tetraethoxysilane, methyltriethoxysilane, dimethyldiethoxysilane, phenyltriethoxysilane, diphenyldiethoxysilane, hexyltrimethoxysilane, hexyltriethoxysilane, de cyltrimethoxysilane, decyltriethoxysilane, and trifluoropropyltrimethoxysilane, and the like.

Monomers generally known as silane coupling agents can be used as the silane compound, examples of which monomers include vinyltrichlorsilane, vinyltrimethoxysilane, vinyltriethoxysilane, p-styrenetrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2(aminoethyl) 3-aminopropylmethyldimethoxysilane, N-2(aminoethyl) 3-aminopropyltrimethoxysilane, N-2(aminoethyl) 3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane hydrochloric acid salt, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanate propyltriethoxysilane, and the like.

The silane compound may contain a hydrolyzable silyl group. The "hydrolyzable silyl group" means a silyl group containing a group that is easily hydrolyzed (hereinafter simply termed "the hydrolyzable group").

Examples of the hydrolyzable group include alkoxy, mercapto, halogen, amide, acetoxy, amino, and isopropenoxy groups.

A silyl group is hydrolyzed to a silanol group. A silanol group is dehydrated and condensed to a siloxane condensate. However, it is preferable that the hydrolyzable silyl group disappears when hydrolyzed following to polymerization. If the hydrolyzable silyl group remains, the resulting ink may have deteriorated storage stability.

The emulsifier is not particularly limited and may be selected appropriately according to the purpose. Examples of the emulsifier include alkylbenzenesulfonic acid and their salt, dialkylsulfosuccinic ester and their salt, alkylnaphthalenesulfonic acid and their salt, alkylnaphthalenesulfonic acid salt formalin condensates, higher fatty acid salt, higher fatty acid ester sulfonic acid salt, ethylene diamine polyoxypropylene-polyoxyethylene condensates, sorbitan fatty acid ester and their salt, aromatic and aliphatic phosphoric acid ester and their salt, dodecylbenzenesulfonate, dodecylsulfate, laurylsulfate, dialkylsulfosuccinate, polyoxyethylenealkylphenylethersulfate, polyoxyethynealkylpropenylphenylethersulfate, alkylphenyletherdisulfonate, polyoxyethylenealkylphosphate, polyoxyethylenealkyletheracetate, polyoxyethylenelanoline alcohol ether, polyoxyethylenelanoline fatty acid ester, laurylalcohol ethoxylate, lauryl ether sulfuric ester salt, lauryletherphosphoric ester, sorbitan fatty ester, fatty diethanolamide, naphthalenesulfonic acid formalin condensates, and the like.

Examples of the salt include sodium and ammonium.

Reactive emulsifiers having an unsaturated double bond can be used as the emulsifier.

Examples of the reactive emulsifier include commercially available Adekalia soap SE, NE, PP (by Asahi Denka), LATEMUL S-180 (by Kao), ELEMINOL JS-2, ELEMINOL RS-30 (by Sanyo Kasei), and Aquaron RN-20 (by Dai-ichi Kogyo Seiyaku), and the like.

The resin fine-particles preferably have an average particle diameter of 10 nm to 300 nm, more preferably 40 nm to 200 nm. When the average particle diameter is smaller than 10 nm, the resin emulsion has a higher viscosity. Therefore, it is sometimes difficult to obtain an ink viscosity dischargeable in a printer. When the average particle diameter is larger than 300 nm, the printer nozzle may clog with the particles, causing discharge malfunction.

The silicone content from the silicone modified acrylic resin is preferably 100 ppm to 400 ppm. When the silicon content is lower than 100 ppm, a coating having excellent abrasion properties and marker resistance may not be obtained. When it is higher than 400 ppm, it becomes highly hydrophobic and may become less stable in the ink.

The silicone modified acrylic resin preferably has the minimum film forming temperature of 20° C. or lower. When the minimum film forming temperature is more than 20° C., sufficient fixing properties may not be obtained. In other words, the pigments may be released and smear the print medium when the printed part is rubbed or crossed over with a marker.

The addition rate of pigments as the colorant in the recording ink is preferably 0.5% by mass to 25% by mass, more preferably 2% by mass to 15% by mass. Generally, the image concentration is increased and a higher image quality is obtained as the pigment concentration is increased. On the other hand, adverse effects on fixing properties and reliability including stable discharge and clogging easily appear. However, the present invention ensures the fixing properties while maintaining the reliability including stable discharge and clogging even when the pigment addition rate is increased.

—Water-Soluble Organic Solvent—

The recording ink of the present invention uses water as a solution medium. However, the following water-soluble organic solvents can be used for giving desired physical properties to the ink, for preventing the ink from drying, or for improving the dissolution stability of the compound of the present invention. Examples of the water-soluble organic solvent include polyvalent alcohols such as ethylene glycol, diethylene glycol, triethylene glycol, polyethylene glycol, polypropylene glycol, 1,3-propanediol, 1,3-butane diol, 1,4-butane diol, 3-methyl-1,3-butandiol, 1,5-pentanediol, 1,6-hexanediol, glycerin, 1,2,6-hexanetriol, 1,2,4-butanetriol, 1,2,3-butanetriol, petriol, 3-methyl-1,3-butanediol, 2,3-butanediol, tetraethylene glycol, 2-methyl-2,4-pentanediol, and thiodiglycol, polyvalent alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether, polyvalent alcohol aryl ethers such as ethylene glycol monophenyl ether and ethylene glycol monobenzyl ether; nitrogen-containing heterocyclic compounds such as N-methyl-2-pyrrolidone, N-hydroxyethyl-2-pyrrolidone, 2-pyrrolidone, 1,3-dimethylimidazolidinone, and ε-caprolactam; amides such as formamide, N-methylformamide, formamide, and N,N-dimethylformamide; amines such as monoethanolamine, diethanolamine, triethanolamine, monoethylamine, diethylamine, and triethylamine, sulfur-containing compounds such as dimethylsulfoxide, sulfolane, and thiodiethanol, propylene carbonate, ethylene carbonate, γ-butylolactone and the like. These solvents may be used individually or in combination of two or more. Among them, glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone, and N-hydroxyethyl-2-pyrrolidone is preferable. 3-methyl-1,3-butanediol is specifically preferable.

The content of the water-soluble organic solvent in the recording ink is preferably 10% by mass to 50% by mass, more preferably 20% by mass to 40% by mass.

The recording ink of the present invention may contain other water-soluble organic solvents where necessary in combination with the water-soluble organic solvents. For example, saccharides are preferable as the other water-soluble organic solvents. Examples of the saccharides include monosaccharides, disaccharides, oligosaccharides (including trisaccharides and tetrasaccharides), polysaccharides, and their derivatives. Among them, glucose, mannose, fructose, ribose, xylose, arabinose, galactose, maltose, cellobiose, lactose, sucrose, trehalose, and maltotriose are preferable. Here, polysaccharides refer to a broader range of sugar including naturally existing substances such as α-cyclodextrin and cellulose.

Examples of the derivatives of the saccharides include reducing sugar of the saccharides (for example, sugar alcohols (those expressed by a general formula: $HOCH_2(CHOH)_nCH_2OH$ (in which n is an integer of 2 to 5)), oxidized sugar (for example aldonic acid and uronic acid), amino acid, and thioic acid. Among these, sugar alcohols are preferable. Examples of the sugar alcohols include maltitol and sorbit.

The content of the saccharides in the recording ink is preferably 0.1% by mass to 40% by mass, more preferably 0.5% by mass to 30% by mass.

The recording ink of the present invention may contain urea or alkylglycine where desired. Examples of the urea include urea, thiourea, ethyleneurea, and 1,3-dimethyl-2-imidazolidinone. Examples of the alkylglycine include N-methylglycine, N,N-dimethylglycine, and N-ethylglycine. Basically, both urea and alkylglycine serve to maintain excellent moisture retention property in aqueous ink (leading to improved storage stability) and exert excellent effects on stable discharge and anti-clogging of the recording head of an inkjet printer. Further, they are useful for adjusting viscosity and surface tension of the ink. Excellent anti-clogging property prevents the head from clogging. Defective discharge such as deviating ink droplets can be prevented during ink discharge.

Generally, the addition rate of the urea and alkylglycine in the recording ink is preferably 0.5% by mass to 50% by mass, more preferably 1% by mass to 20% by mass. When the addition rate is smaller than 0.5% by mass, desired requirements on an inkjet printer recording head may not be satisfied. When it is higher than 50% by mass, it causes high viscosity and may lead to adverse effects on ink storage stability and defective discharge.

The other components are not particularly limited and may be appropriately selected according to the purpose. For example, pH adjusters, preservatives/fungicides, rust prevention agents, antioxidants, ultraviolet absorbers, oxygen absorbers, and light stabilizers may be used.

Examples of the preservatives/fungicides include 1,2-benzisothiazoline-3-on, sodium dehydroacetate, sodium sorbate, 2-pyridinethiol-1-oxide sodium, sodium benzoate, and pentachlorophenol sodium, and the like.

The pH adjusters are not particularly limited and any substances may be used according to the purpose as long as they can be used to adjust the pH for 7 or higher without adverse effects on the ink to be prepared.

Examples of the pH adjusters include amines such as diethanolamine and triethanolamine, alkali metal hydroxides such as lithium hydroxide, sodium hydroxide, and potassium hydroxide; ammonium hydroxide, quaternary ammonium hydroxide, quaternary phosphonium hydroxide, and alkali metal carbonates such as lithium carbonate, sodium carbonate, and potassium carbonate, and the like.

Examples of the rust prevention agents include acidic sulfite, sodium thiosulfate, anmone thioglycolate, diisopropylammoniumnitrite, pentaerythritol tetranitrate, dicyclohexylammoniumnitrite, and the like.

Examples of the antioxidants include phenolic antioxidants (including hindered phenolic antioxidants), amine antioxidants, sulfur antioxidants, phosphorus antioxidants, and the like.

Examples of the phenolic antioxidants (including hindered phenolic antioxidants) include butylated hydroxyanisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tetrakis[methylene-3-(3',5'-di-tert-butyl-4'-hydroxyphenyl)propionate]methane, and the like.

Examples of the amine antioxidants include phenyl-β-naphthylamine, α-naphthylamine, N,N'-di-sec-butyl-p-phenyldiamine, phenothiazine, N,N'-diphenyl-p-phenylenediamine, 2,6-di-tert-butyl-p-cresol, 2,6-di-tert-butylphenol, 2,4-dimethyl-6-tert-butyl-phenol, butylhydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3(3,5-di-tert-butyl-4-dihydroxyphenyl)propionate]methane, 1,1,3-tris(2-methyl-4-hydroxy-5-tert-butylphenyl)butane, and the like.

Examples of the sulfur antioxidants include dilauryl 3,3'-thiodipropionate, distearylthiopropionate, laurylstearylthiopropionate, dimyristyl 3,3'-thiodipropionate, distearyl β,β'-thiodipropionate, 2-mercaptobenzoimidazole, dilaurylsulfide, and the like.

Examples of the phosphorus antioxidants include triphenylphosphite, octadecylphosphite, triisodecylphosphite, trilauryltrithiophosphite, trinonylphenylphosphite, and the like.

Examples of the ultraviolet absorbers include benzophenone, benzotriazole, salicylate, cyanoacrylate, nickel complex salt ultraviolet absorbers, and the like.

Examples of the benzophenone ultraviolet absorbers include 2-hydroxy-4-n-octoxybenzophenone, 2-hydroxy-4-n-dodecyloxybenzophenone, 2,4-dihydroxybenzophenone, 2-hydroxy-4-methoxybenzophenone, 2,2',4,4'-tetrahydroxybenzophenone, and the like.

Examples of the benzotriazole ultraviolet absorbers include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, 2-(2'-hydroxy-3'-tert-butyl-5'-methylphenyl)-5-chlorobenzotriazole, and the like.

Examples of the salicylate ultraviolet absorbers include phenylsalicylate, p-tert-butylphenylsalicylate, p-octylphenylsalicylate, and the like.

Examples of the cyanoacrylate ultraviolet absorbers include ethyl-2-cyano-3,3'-diphenylacrylate, methyl-2-cyano-3-methyl-3-(p-methoxyphenyl)acrylate, and butyl-2-cyano-3-methyl-3-(p-methoxyphenyl)acrylate.

Examples of the nickel complex salt ultraviolet absorbers include nickelbis(octylphenyl)sulfide, 2,2'-thiobis(4-tert-octylphelate)-n-butylaminenickel (II), 2,2-thiobis(4-tert-octylphelate)-2-ethylhexylaminenickel (II), 2,2'-thiobis(4-tert-octylphelate)triethanolaminenickel (II), and the like.

The recording ink of the present invention is produced by dispersing or dissolving at least water, a colorant, and at least one fluorochemical surfactant selected from the above Structural Formulae (1) to (3) and, where necessary, other components in an aqueous medium and, where necessary, stirring/mixing them. The dispersing can be done by, for example, a sand mill, a homogenizer, a ball mill, a paint shaker, or an ultrasonic disperser. The stirring/mixing can generally be done by, for example, a stirrer having stirring blades, a magnetic stirrer, or a high speed disperser.

Physical properties of the recording ink of the present invention are not particularly limited and may be appropriately selected according to the purpose. For example, the recording ink of the present invention preferably has the following ranges of viscosity, surface tension, and pH.

The viscosity is preferably 5 mPa·sec to 20 mPa·sec., more preferably 5 mPa·sec. to 10 mPa·sec., at 25° C. When the viscosity is higher than 20 mPa·sec., it becomes difficult to ensure stable discharge.

The surface tension is preferably 22 mN/m to 55 mN/m at 20° C. When the surface tension is lower than 22 mN/m, running ink is noticeable on papers and stable jet may not be obtained. When it is higher than 55 mN/m, the ink does not sufficiently infiltrate into papers, which may prolong drying time.

The pH is, for example, preferably 7 to 10.

The coloring of the recording ink of the present invention is not particularly limited and may be appropriately selected according to the purpose. Yellow, magenta, cyan, and black can be used. An ink set comprising a combination of two or more of these colorings can be used in recording to form multicolor images. An ink set comprising all the colorings can be used in recording to form full color images.

The recording ink of the present invention can be successfully used in printers provided with any types of inkjet heads including a piezo-type in which a piezoelectric element is used to pressurize ink in the ink passage, a diaphragm forming the wall of the ink passage is deformed to change the inner volume of the ink passage, thereby discharging ink droplets (Japanese Patent Application Laid-Open (JP-A) No. 02-51734), a thermal type in which an exothermic resistor is used to heat ink in the ink passage to produce bubbles (Japanese Patent Application Laid-Open (JP-A) No. 61-59911), and an electrostatic type in which a diaphragm forming the wall of the ink passage and electrodes are placed at facing positions and electrostatic force is produced between the diaphragm and the electrodes to deform the diaphragm and change the inner volume of the ink passage, thereby discharging ink droplets (Japanese Patent Application Laid-Open (JP-A) No. 06-71882).

The recording ink of the present invention can be preferably used in a variety of fields. It can be preferably used in image forming apparatus (such as printers) of an inkjet recording system. For example, the recording ink of the present invention can be used in a printer having a function to heat recording papers and the recording ink to 50° C. to 200° C. before, during, or after printing, thereby urging ink fixing. Particularly, the recording ink of the present invention can be preferably used in the ink cartridge, ink record, inkjet recording apparatus, and inkjet recording method of the present invention described hereinafter.

(Ink Cartridge)

The ink cartridge of the present invention comprises a container containing the recording ink of the present invention and other appropriated selected members as required.

The container is not particularly limited and its shape, structure, size, and material are appropriately selected according to the purpose. Preferred embodiments include those at least having an ink pouch formed by aluminum laminated film or resin film.

Figure 2:
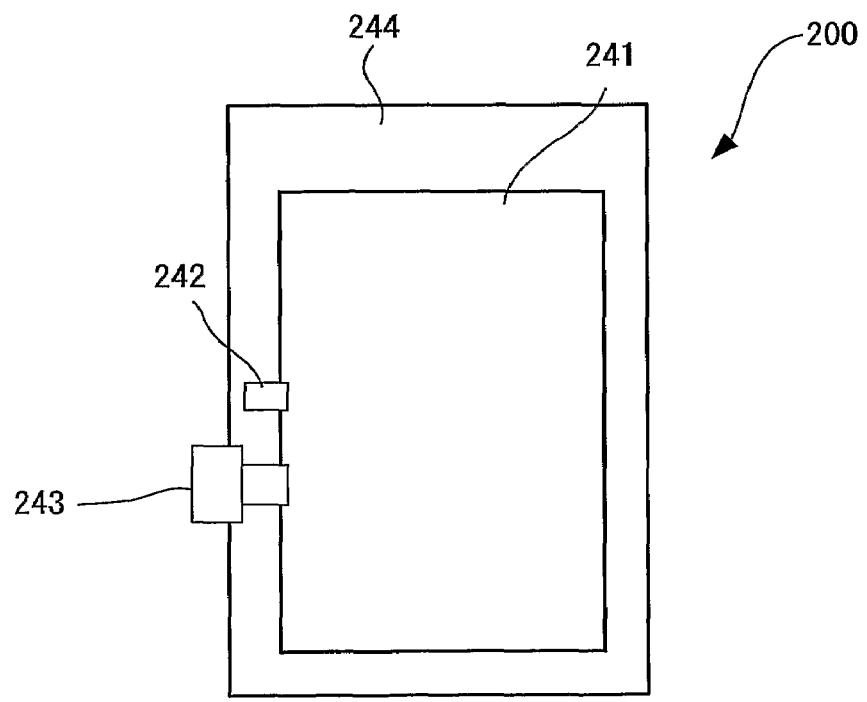
FIG. 2 is a schematic illustration showing an example of the ink cartridge of FIG. 1 including a case (exterior).

The ink cartridge is hereinafter described with reference to FIGS. 1 and 2. FIG. 1 is an illustration showing an embodiment of the ink cartridge of the present invention. FIG. 2 is an illustration of the ink cartridge of FIG. 1 including a case (exterior).

In an ink cartridge 200, as shown in FIG. 1, an ink pouch 241 is filled through an ink inlet 242. The ink inlet 242 is closed by fusion bonding after the air is exhausted. An ink outlet 243 made of a rubber material is pierced by a needle on the apparatus body for use, thereby the ink is supplied to the apparatus.

The ink pouch 241 is formed by a packaging member such as a non-permeable aluminum laminated film. The ink pouch 241 is housed in a cartridge case 244 generally made of plastics as shown in FIG. 2 and detachably mounted on various types of inkjet recording apparatus.

The ink cartridge of the present invention contains the recording ink (ink set) of the present invention. The ink cartridge of the present invention can be detachably mounted on variety types of inkjet recording apparatus and it is particularly preferable that the ink cartridge of the present invention is detachably mounted on the inkjet recording apparatus of the present invention described later.

(Inkjet Recording Apparatus and Inkjet Recording Method)

The first embodiment of the inkjet recording apparatus of the present invention at least comprises an ink drops discharging unit configured to discharge the recording ink drops to form an image by applying impulse to the recording ink and, where necessary, further comprises other appropriately selected units such as an impulse generation unit and a control unit.

The second embodiment of the inkjet recording apparatus of the present invention at least comprises an ink drops discharging unit configured to discharge the recording ink drops to form an image by applying impulse to the recording ink and, where necessary, further comprises other appropriately selected units such as an impulse generation unit and a control unit.

The ink drops discharging unit is a nozzle head portion having a silicone resin-containing ink-repellent layer on the ink discharging surface and the ink used in the inkjet recording apparatus contains at least water, a colorant, a fluorochemical surfactant, and an aminopropanediol compound.

The first embodiment of the inkjet recording method of the present invention at least comprises an ink drops discharging step of discharging the recording ink drops to form an image by applying impulse to the recording ink and, where necessary, further comprises other appropriately selected steps such as an impulse generation step and a control step.

The second embodiment of the inkjet recording method of the present invention at least comprises an ink drops discharging step of discharging the recording ink drops to form an image by applying impulse to the recording ink, where necessary, further comprises other appropriately selected steps such as an impulse generation step and a control step.

The ink drops discharging is performed using a nozzle head portion having a silicone resin-containing ink repellent layer on the ink discharging surface and the ink used in the inkjet recording method contains at least water, a colorant, a fluorochemical surfactant, and an aminopropanediol compound.

The inkjet recording method of the present invention is preferably performed in the inkjet recording apparatus of the present invention. The ink drops discharging step is preferably performed by the ink drops discharging unit. Further, the other steps are preferably performed by the other units.

—Ink Drops Discharging Step and Ink Drops Discharging Unit—

The ink drops discharging step is a step of discharging the ink drops to form an image by applying impulse to the ink.

The ink drops discharging unit is a unit configured to discharge the ink drops to form an image by applying impulse to the ink.

The ink drops discharging unit is not particularly limited and may be appropriately selected according to the purpose. Examples of the drops discharging unit include (1) a piezo-type nozzle head in which a piezoelectric element is used to pressurize ink in the ink passage, a diaphragm forming the wall of the ink passage is deformed to change the inner volume of the ink passage, thereby discharging ink droplets (Japanese Patent Application Laid-Open (JP-A) No. 02-51734), (2) a thermal type nozzle head in which an exothermic resistor is used to heat ink in the ink passage to produce bubbles (Japanese Patent Application Laid-Open (JP-A) No. 61-59911), and (3) an electrostatic type nozzle head in which a diaphragm forming the wall of the ink passage and electrodes are placed at facing positions and electrostatic force is produced between the diaphragm and the electrodes to deform the diaphragm and change the inner volume of the ink passage, thereby discharging ink droplets (Japanese Patent Application Laid-Open (JP-A) No. 06-71882).

The nozzle head preferably has a silicone-containing ink-repellent layer on the ink discharging surface. In the present invention, the ink-repellent layer is made of a silicone resin-containing structure so that it maintains sufficient ink-repellency to a fluorochemical surfactant-containing ink.

The silicone resin-containing structure is a structure of silicone resin by itself or in combination with other components such as other resins and metals. Examples of effective structures include (1) silicone resin fine-particles dispersed in a fluororesin, (2) a kneaded mixture of silicone resin and polypropylene, and (3) silicone resin/Ni eutectoid plating. Among them, a mixture of silicone resin and other components is effective for preventing the silicone resin from eluting from the ink-repellent layer.

The silicone resin is a resin having as a basic skeleton a siloxane bond consisting of Si and O and commercially available in a variety of forms such as oils, resins, and elastomers. In addition to water-repellency, which is important in the present invention, the silicone resin has a variety of characteristics such as heat resistance, release property, anti-foaming, and adhesiveness. The silicone resin can be cold curable, heat curable, or UV curable, being selectively used according to production methods and applications.

The method of forming a silicon resin-containing ink-repellent layer on a nozzle surface is not particularly limited and may be appropriately selected according to the purpose. Examples of the method include (1) vacuum deposition of a liquid silicone resin material, (2) plasma polymerization of an silicone oil, (3) application such as spin coating, dipping, and spray coating, and (4) electrodeposition.

In forming a silicone resin layer by any method except for electrodeposition, the nozzle hole and nozzle back surface are masked with photoresist or water-soluble resin and the resist is peeled off and removed after the formation of the silicone resin layer, thereby a silicone resin ink-repellent layer can be formed only on the front surface of the nozzle plate. In such a case, a strong alkali releasant is not preferable because it may damage the silicone resin layer.

The thickness of the silicon resin layer as the ink-repellent layer is not particularly limited and may be appropriately selected according to the purpose. The thickness is preferably 0.1 μm to 5.0 μm, more preferably 0.1 μm to 1.0 μm. When the thickness is smaller than 0.1 μm, mechanical resistances such as wiping resistance and abrasion resistance may be deteriorated.

When it is larger than 5.0 μm, the adhesion between the silicone resin layer and the substrate may be deteriorated or uneven ink-repellency may be obtained.

It is preferable that the liquid chamber, fluid dragging part, diaphragm, and nozzle member of the nozzle head part be at least partly made of materials containing at least either silicon or nickel.

The nozzle diameter of the nozzle head part is preferably 50 μm or less and more preferably him to 30 μm. It is preferable that subtanks for supplying ink be provided on the inkjet head and the ink is supplied to the subtanks from the ink cartridge via supply tubes.

The impulse may be generated by, for example, the impulse generation unit. The impulse is not particularly limited and may be appropriately selected according to the purpose. Examples of the impulse include heat (temperature), pressure, vibration, and light. These can be used individually or in combination or two or more. Among them, heat and pressure are preferable.

The impulse generation unit may be, for example, a heating apparatus, a pressurizing apparatus, a piezoelectric element, a vibration generation apparatus, an ultrasonic oscillator, or a light. Specifically, examples of the impulse generation unit include a piezoelectric actuator such as a piezoelectric element, a thermal actuator using an electrothermal conversion element such as an exothermic resistor to cause film boiling and, accordingly, phase change of a liquid, a shape-memory alloy actuator using metal phase changes due to temperature changes, an electrostatic actuator using electrostatic force.

The aspect of the ink drops discharging is not particularly limited, and varies depending on the type of the impulse. For example, when the impulse is "heat," thermal energy corresponding to recording signals is applied to the ink in the recording head, for example, using a thermal head, the thermal energy causes the ink to bubble, and the bubble pressure urges the ink to be discharged as ink droplets from the nozzle hole of the recording head. When the impulse is "pressure," for example, an electric voltage is applied to a piezoelectric element bonded at a position called a pressure chamber within the ink passage of the recording head, the piezoelectric element is bent and the pressure chamber is reduced in volume, thereby the ink is discharged as droplets from the nozzle hole of the recording head.

The discharged ink droplets preferably have a particle size of 3 pl to 4 pl, a discharge jet speed of 5 m/sec to 20 m/sec, a driving frequency of 1 kHz or higher, and a resolution of 300 dpi or higher.

The control unit is not particularly limited and may be appropriately selected according to the purpose as long as it is capable of controlling the operation of each unit. Examples of the control unit include devices such as a sequencer and a computer.

The ink used in the second embodiment of the inkjet recording method and inkjet recording apparatus contains at least water, a colorant, a fluorochemical surfactant, and an aminopropanediol compound and, where necessary, further contains other components.

—Aminopropanediol Compound—

The aminopropanediol compound is a water-soluble organic basic compound and preferably, for example, aminopropanediol derivatives.

The aminopropanediol derivatives are not particularly limited and may be appropriately selected according to the purpose. Examples of the aminopropanediol derivatives include 1-amino-2,3-propanediol, 1-methylamino-2,3-propanediol, 2-amino-2-methyl-1,3-propanediol, and 2-amino-2-ethyl-1,3-propanediol. Among them, 2-amino-2-ethyl-1,3-propanediol is particularly preferable.

The 2-amino-2-ethyl-1,3-propanediol is excellent in view of anti-clogging and stable discharge in addition to significant effects on preventing the silicone resin from eluting from the ink-repellent layer forming a printer nozzle member, which is the purpose of the present invention.

The addition rate of the aminopropanediol compound in the ink is preferably 0.01% by mass to 10% by mass, more preferably 0.1% by mass to 5.0% by mass, further preferably 0.1% by mass to 2.0% by mass. The addition rate of the aminopropanediol compound is adjusted according to the type and content of colorants and ultimately determines the optimum values for an inkjet recording apparatus. When the addition rate is excessively low, the elution preventive effect on the silicone resin layer of the nozzle member may not observed. Excessively high rates may increase pH, which may otherwise adversely affect reliability and cause demerits such as increased viscosities.

—Fluorochemical Surfactant—

The fluorochemical surfactant is added to ink so as to stably disperse colorants in the ink and improve ink wettability to papers, thereby images having improved color development and less running ink can be obtained.

The fluorochemical surfactant is not particularly limited and may be appropriately selected according to the purpose. Examples of the fluorochemical surfactant include perfluoroalkylsulfonate, perfluoroalkylcarboxylate, perfluoroalkylphosphoric ester, perfluoroalkylethyleneoxide adducts, perfluoroalkylbetaine, perfluoroalkylamineoxide compounds, and compounds having the following Structural Formula (A). Among them, the compounds having the following Structural Formula is preferable in view of reliability.

$$CF_3CF_2(CF_2CF_2)_j\text{—}CH_2CH_2O(CH_2CH_2O)_kH \quad \text{Structural Formula (A)}$$

where, j and k are integers; j is preferably of 0 to 10 and k is preferably of 0 to 40 in the Structural Formula (A) above.

Commercially available fluorochemical surfactants can be used, including Surflon S-111, S-112, S-113, S-121, S-131, S-132, S-141, and S-145 (by Asahi Glass Co., Ltd.); FLUO-RAD FC-93, FC-95, FC-98, FC-129, FC-135, FC-170C, FC-430, FC-431, and FC4430 (by Sumitomo 3M Limited); Megafack F-470, F-1405, and F-474 (by Dainippon Ink & Chemicals Inc.); Zonyl FS-300, FSN, FSN-100, FSO (by DuPont Kabushiki Kaisha); EFTOP EF-351, EF-352, EF-801, and EF-802 (by JEMCO Inc). Among them, Zonyl FS-300, FSN, FSN-100, and FSO (by DuPont Kabushiki Kaisha) are particularly preferable in view of excellent reliability and improved color development. These commercially available products are often a mixture of several compounds having different molecular masses (in the Structural Formula (A) above, j and k have distributions). However, they are approved for the efficacy of the present invention without any problems.

Among other preferable fluorochemical surfactants, at least one selected from the Structural Formulae (1) to (3) above in the recording ink is preferable.

The same colorants and other components as the recording ink can be used.

An embodiment of the inkjet recording method of the present invention using the inkjet recording apparatus of the present invention is described hereinafter, with reference to the drawings. An inkjet recording apparatus shown in FIG. 3 comprises an apparatus body 101, a feeder tray 102 attached to the apparatus body 101 for feeding papers, paper output tray 103 attached to the apparatus body 101 for receiving papers on which images are recorded (formed), and an ink cartridge mounting part 104. An operation part 105 having operation keys and indicators is provided on the top surface of the ink cartridge mounting part 104. The ink cartridge mounting part 104 has a front cover 115 that can be opened and/or closed to remove and/or place ink cartridges 201.

Figure 4:
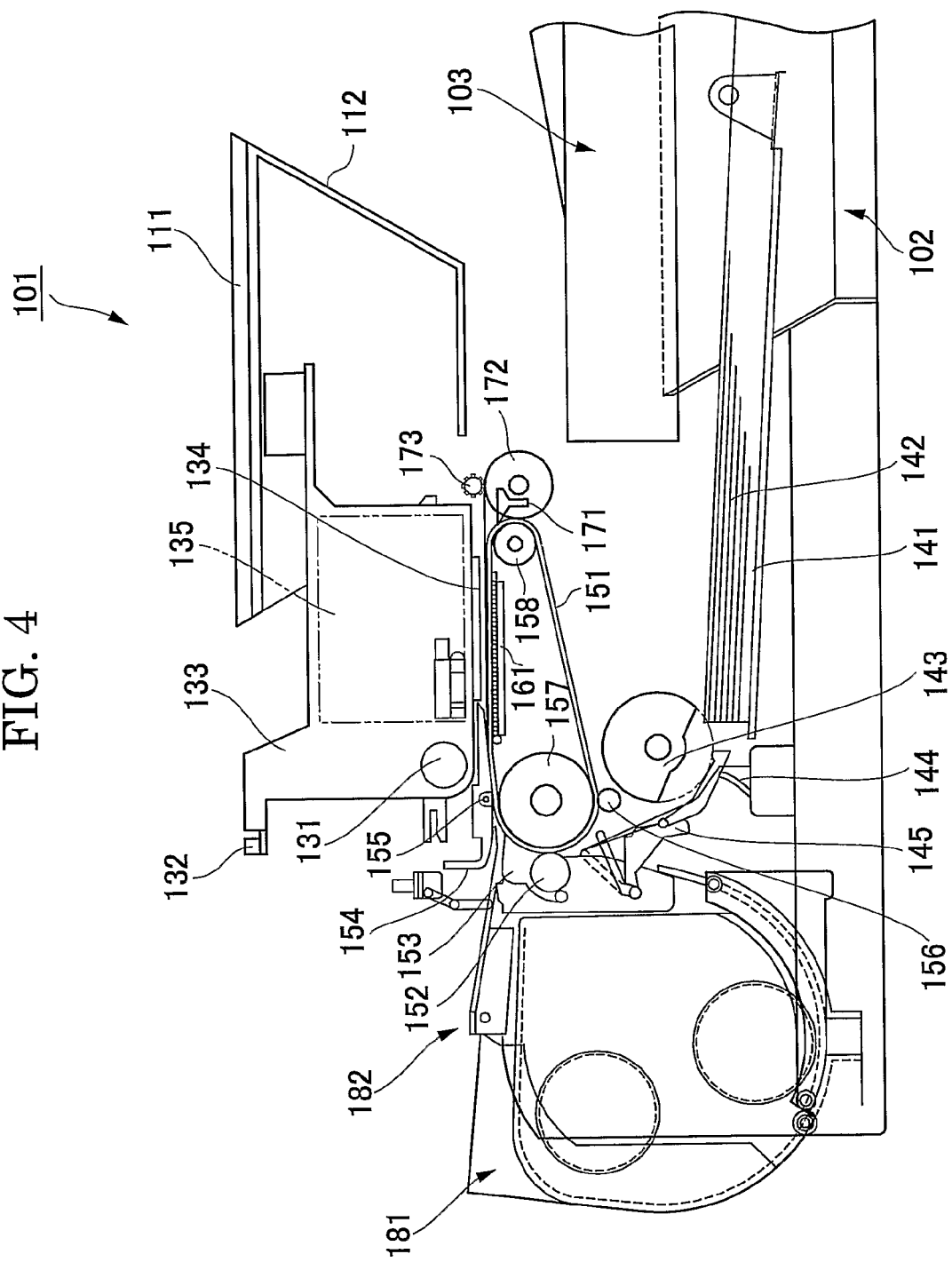
FIG. 4 is a schematic illustration showing an example of the entire structure of an inkjet recording apparatus.
Figure 5:
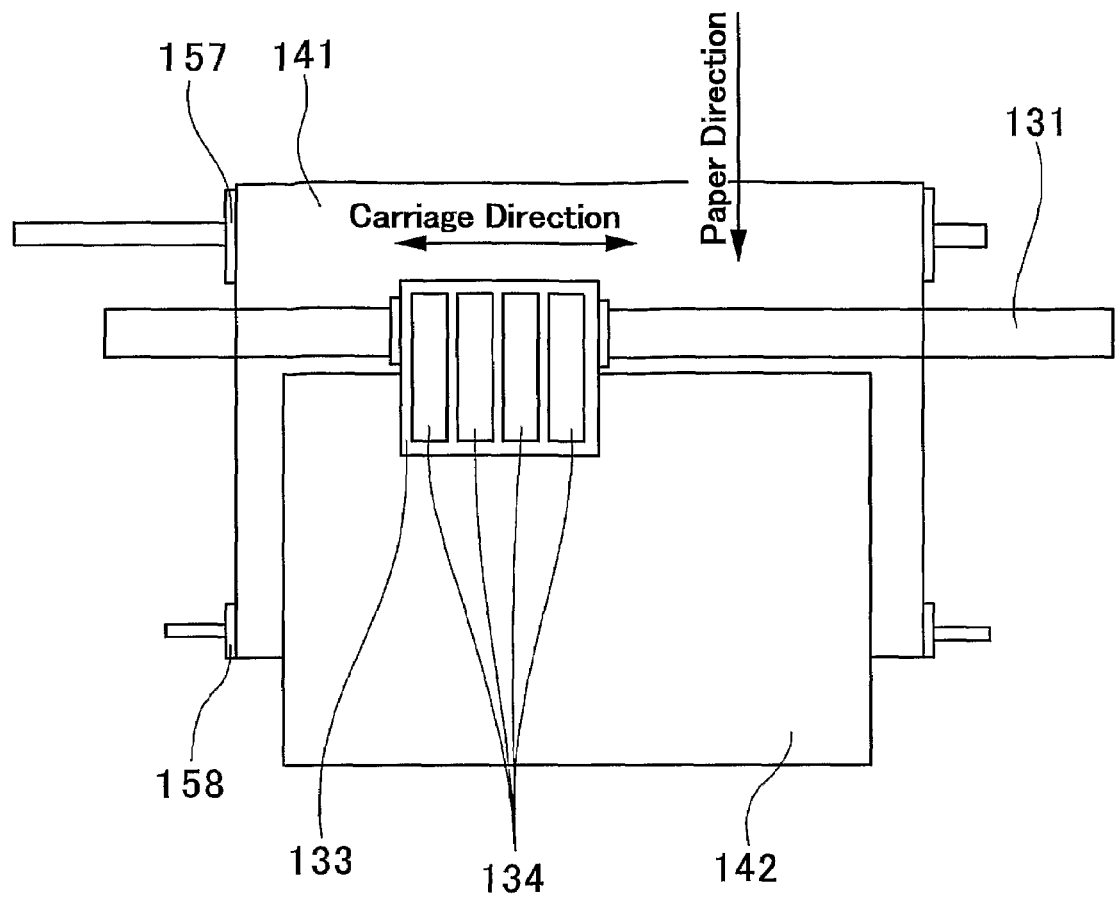
FIG. 5 is a schematic enlarged view showing an example of the inkjet head of the present invention.

As shown in FIGS. 4 and 5, a carriage 133 is supported slidably in the scan direction by a guide rod 131 that is a guide member laid across not shown right and left side plates and a stay 132 and moved by a main motor (not shown) in the arrowed directions in FIG. 5 for scanning within the apparatus body 101.

Recording heads 134 consisting of four inkjet recording heads that discharge yellow (Y), cyan (C), magenta (M), and black (B) recording ink droplets, respectively, have ink discharge ports arranged in the intersecting direction with the main scanning direction and they are placed with their ink discharge direction downward.

Inkjet recording heads constituting the recording heads 134 are provided with an energy generation unit for discharging recording ink such as a piezoelectric actuator such as an piezoelectric element, a thermal actuator using an electrothermal conversion element such as an exothermic resistor to cause film boiling and, accordingly, phase change of a liquid, a shape-memory alloy actuator using metal phase changes due to temperature changes, and an electrostatic actuator using electrostatic force.

The carriage 133 is provided with subtanks 135 for supplying each color ink to the recording heads 134. The subtanks 135 are filled with the recording ink of the present invention from the ink cartridge 201 of the present invention mounted in the ink cartridge mounting part 105 via a not-shown recording ink supply tube.

On the other hand, a paper feed part for feeding paper 142 stuck on a paper load part (platen) 141 of the feed tray 102 comprises a half-moon roller (a feed roller 143) that separates and supplies the paper 142 from the paper load part 141 one by one and a separation pad 144 that faces the feed roller 143 and is made of a large friction coefficient material. The separation pad 144 is biased toward the feed roller 143.

A conveying part for conveying the paper 142 supplied from the feed part underneath the recording heads 134 comprises a conveying belt 151 for electrostatically adsorbing and conveying the paper 142, a counter roller 152 for conveying the paper 142 sent from the paper feed part via a guide 145 by clamping it together with the conveying belts 151, a conveying guide 153 for turning the paper 142 sent nearly vertically by 90° so as to lay it on the conveying belt 151, and a leading end pressure roller 155 that is biased toward the conveying belt 151 by a presser member 154. A charging roller 156 that is a charging unit for charging the surface of the conveying belt 151 is also provided.

The conveying belt 151 is an endless belt, being placed over conveying roller 157 and a tension roller 158 and running around in the belt conveying direction. For example, the conveying belt 151 has a front layer that is a paper adsorbing surface made of a dragging-uncontrolled resin, for example a copolymer of tertafluoroethylene and ethylene (ETFE), having a thickness of 40 μm and a back layer (an intermediate dragging layer or an earth layer) made of the same material as the front layer, but dragging-controlled with carbon. A guide member 161 is provided behind the conveying belt 151 at the corresponding position to the printing area by the recording heads 134. An output part for discharging the paper 142 on which recording was done by the recording heads 134 comprises a separation click 171 for separating the paper 142 from the conveying belt 151, paper output roller 172, and an paper output roller 173. Paper output tray 103 is disposed below paper output roller 172.

A double-side feed unit 181 is detachably mounted in the back of the apparatus body 101. The double-side feed unit 181 takes in the paper 142 that is moved backward as the conveying belt 151 is rotated in the reverse direction, turns it over, and feeds it again between the counter roller 152 and the conveying belt 151. A manual feeder 182 is provided on the top surface of the double-side feed unit 181.

In this inkjet recording apparatus, the paper 142 is separated and fed from the paper feed part one by one. Being fed vertically, the paper 142 is guided by the guide 145 and conveyed between the conveying belt 151 and the counter roller 152. Then, it is guided by the conveying guide 153 at the leading end and is pressed against the conveying belt 151 by the leading end pressure roller 155 to change the convey direction nearly by 90°.

Meanwhile, the conveying belt 157 is charged by the charging roller 156 and the paper 142 is electrostatically adsorbed and conveyed by the conveying belt 151. Then, the recording heads 134 are driven according to image signals while the carriage 133 is moved. Ink droplets are discharged on the paused paper 142 for recording one-line. Then, the paper 142 is conveyed by a certain rate for recording the next line. Receiving a recording end signal or a signal indicating the rear end of the paper 142 has reached the recording area, the recording operation is terminated and the paper 142 is discharged to the paper output tray 103.

When it is detected that the remaining amount of the recording ink in the subtank 135 is nearly to the end, a certain amount of recording ink is supplied to the subtank 135 from the ink cartridge 201.

In this inkjet recording apparatus, when the recording ink in the ink cartridge 201 of the present invention is used up, the case of the ink cartridge 201 is disassembled and only the ink pouch contained therein can be exchanged. The ink cartridge 201 allows for stable recording ink supply even in a vertical and front mounting structure. Therefore, when the apparatus body 101 is installed with the top being blocked by something, for example, the ink cartridge 210 can be housed in a rack. Even if something is placed on the top surface of the apparatus body 101, the ink cartridge 201 can be easily replaced.

Here, the explanation is made with reference to an application in a serial type (shuttle type) inkjet recording apparatus in which the carriage scans is described. A line type inkjet recording apparatus having a line head is also applicable.

The inkjet recording apparatus and inkjet recording method of the present invention are applicable to various recording in an inkjet recording system. For example, the inkjet recording apparatus and inkjet recording method of the present invention can be particularly preferably applied to inkjet recording printers, facsimiles, copy machines, and printer/fax/copy complex machines.

An inkjet head to which the present invention is applied is described hereinafter.

Figure 6:
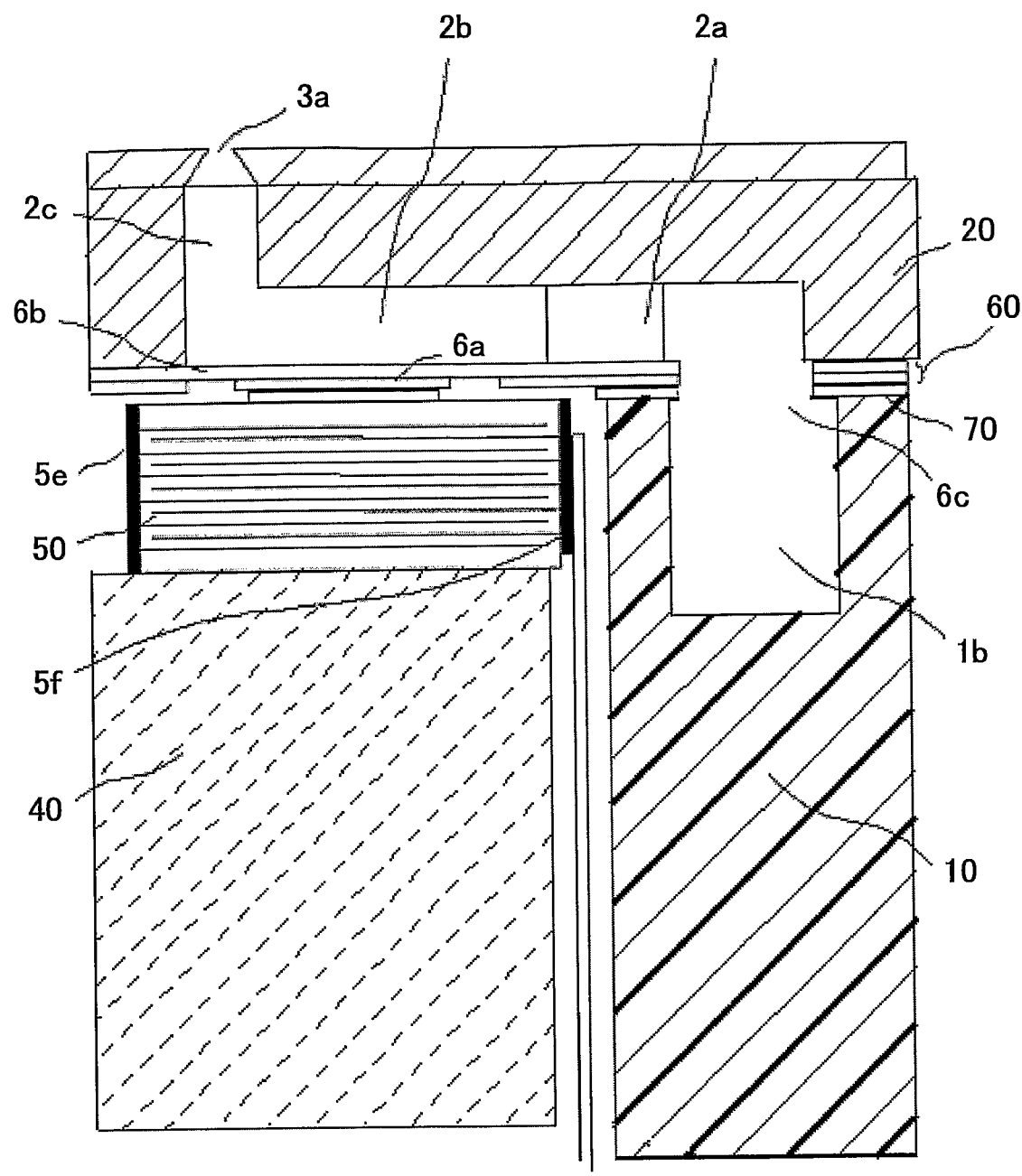
FIG. 6 is an enlarged view of the components showing an example of the inkjet head of the present invention.
Figure 7:
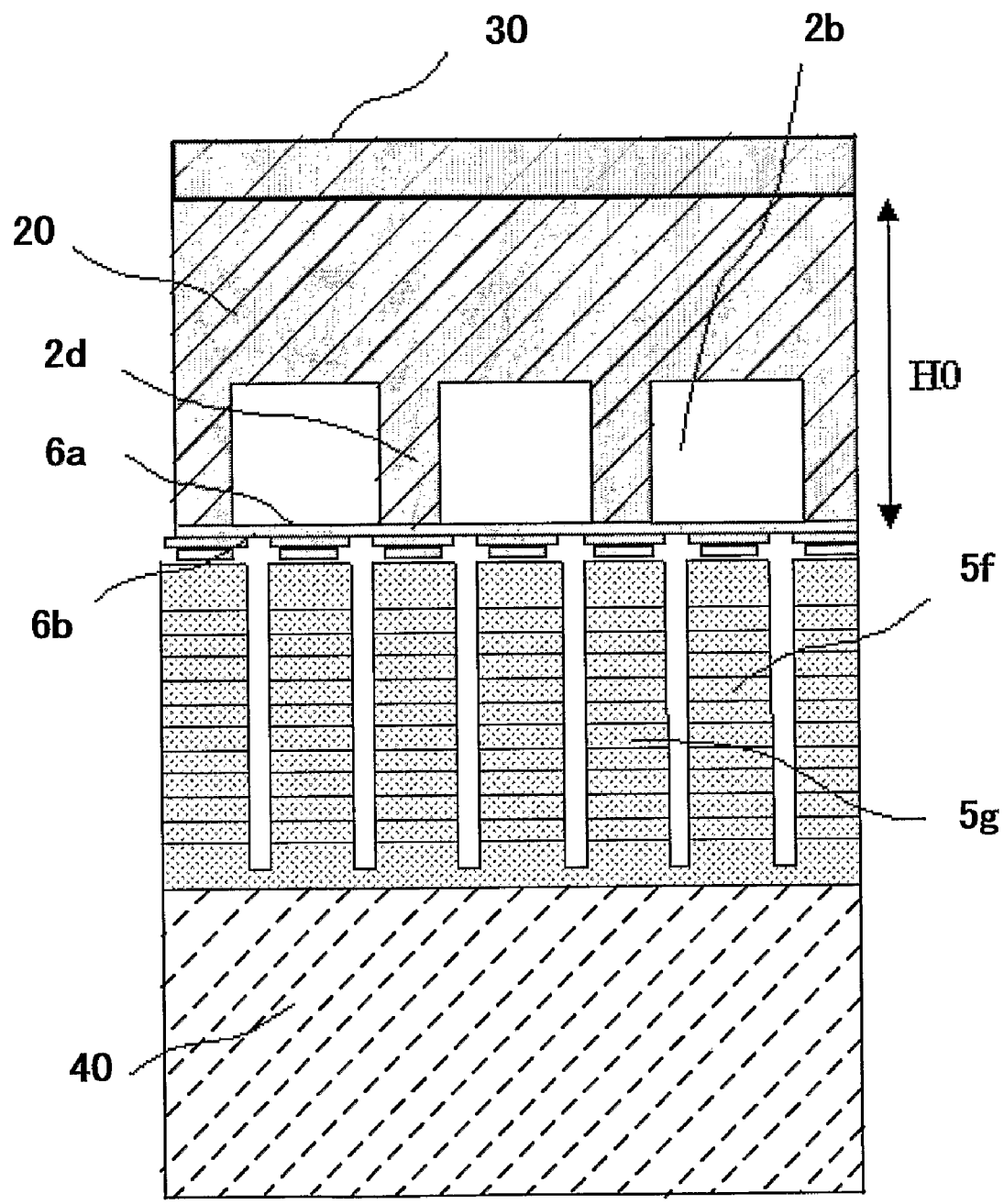
FIG. 7 is an enlarged cross-sectional view of the components showing an example of the inkjet head of the present invention.

FIG. 6 is an enlarged view of the core part of the inkjet head according to an embodiment of the present invention. FIG. 7 is an enlarged cross-sectional view of the core part of the same head in the inter-channel direction.

This inkjet head comprises a frame 10 having cutouts serving as an ink supply port (not shown) and a common liquid chamber 1b, a passage plate 20 having cutouts serving as a fluid dragging part 2a and a pressurized liquid chamber 2b and a communication port 2c that communicates to a nozzle 3a, a diaphragm 60 having a raised part 6a, a diaphragm part 6b, and an ink inflow port 6c, a laminated piezoelectric element 50 connected to the diaphragm 60 via an adhesive layer 70, and a base 40 on which the laminated piezoelectric element 50 is fixed.

The base 40 is made of barium titanate ceramics, on which two rows of laminated piezoelectric element 50 are arranged and connected.

The piezoelectric element 50 consists of alternately laminated piezoelectric layers of lead zirconate titanate (PZT) having a thickness of 10 μm to 50 μm per layer and internal electrode layers of silver palladium (AgPd) having a thickness of several μm per layer. The internal electrode layers are connected to external electrodes at both ends.

The laminated piezoelectric element 50 is divided into a comb-like shape by half-cut dicing, having driving parts 5f and supporting parts (non-driving part) 5g every other division. The exterior of the external electrodes is processed, for example notched, for limiting on length, thereby being divided by half-cut dicing. Multiple separate electrodes are formed. Not divided by dicing, the other is conductive and serves as a common electrode.

A FPC8 is soldered to the individual electrodes of the driving part. The common electrode is turned in an electrode layer provided at the end of the laminated piezoelectric layer and connected to the Gnd electrode of the FPC8. An un-shown driver IC is mounted on the FPC8 to control the application of driving voltage to the driving part 5f.

As for the diaphragm 60, a thin film diaphragm part 6b, an island-shaped raised part (island part) 6a formed at the center of the diaphragm part 6b and connected to the laminated piezoelectric element 50 serving as the driving parts 5f, a thick part including beams to be connected to the supporting part, and an opening serving as in ink inflow port 6c are formed by electroforming two nickel plated films. The diaphragm has a thickness of 3 μm and a width (one side) of 35 μm.

The connections between the island part 6a of the diaphragm 60 and the movable parts 5f of the laminated piezoelectric element 50 and between the diaphragm 50 and the frame 10 are made by patterning the adhesive layer 70 including a gap material.

The passage plate 20 is made of a silicon mono-crystalline substrate, in which cutouts serving as a liquid dragging part 2a and a pressurized liquid chamber 2b and a through-hole provided at the corresponding position to the nozzle 3a and serving as a communication port 2c are patterned by etching.

The remaining part after the etching serves as a partition wall 2d of the pressurized liquid chamber 2b. In this head, a part etched in a smaller width serves as the liquid dragging part 2a.

The nozzle plate 30 is made of a metal material such as a nickel plated film formed by electroforming and has a number of nozzles 3a serving as fine discharge openings for discharging ink droplets. The nozzle 3a has a horn-like (nearly cylindrical or nearly truncated cone) internal shape (inner shape). The nozzle 3a has a diameter of approximately 20 μm to 35 μm at the ink droplets discharge side. The nozzle pitch in each row is 150 dpi.

The ink discharging surface (nozzle front side) of the nozzle plate 30 is provided with a water-repellent finish layer 3b having a not shown water-repellent finish surface. A water-repellent finish film selected according to ink's physical properties such as PTFE-Ni eutectoid plating and electrodeposition of fluororesin, deposition of volatile fluororesin, silicone resin and fluororesin solvent application and baking can be provided to stabilize ink droplet shapes and discharging property and, thus, ensure a high image quality. Among them, for example many fluororesins are known; excellent water-repellency can be obtained by depositing modified perfluoropolyoxethane (by Daikin Industies, Ltd, trade name: Optool DSX) to a thickness of 30 Å to 100 Å.

The frame 10 in which cutouts serving as an ink supply inlet and a common liquid chamber 1b are formed is made by molding a resin.

In an inkjet head having the above structure, a driving waveform (10V to 50V pulse voltage) is applied to the driving part 5f according to recording signals. The driving part 5f is shifted in the lamination direction. The pressurized liquid chamber 2b is pressurized via the diaphragm 30 and the pressure is increased, thereby ink droplets are discharged through the nozzle 3a.

After the ink droplets discharge is completed, the ink pressure in the pressurized liquid chamber 2b is decreased. The inertia ink flow and driving pulse discharge process causes negative pressure within the pressurized liquid chamber 2b, leading to the ink supply process. Meanwhile, the ink supplied from the ink tank enters the common liquid chamber 1b and further fills the pressurized liquid chamber 2b from the common liquid chamber 1b via the ink inflow port 6c and fluid dragging part 2a.

The fluid dragging part 2a effectively attenuates residual pressure fluctuation while it stands against recharging (refilling) due to surface tension. Appropriately selected dragging part balances residual pressure attenuation with refilling time and shortens the transition time to the next ink droplets discharge operation (driving cycle).

(Ink Record)

The ink record recorded by the inkjet recording apparatus and inkjet recording method of the present invention is the ink record of the present invention. The ink record of the present invention comprises images formed on recording media using the recording ink of the present invention.

The recording media are not particularly limited and may can be appropriately selected according to the purpose. Examples of the recording media include regular papers, glossy papers, special papers, cloths, films, and OHP sheets. These can be used individually or in combination of two or more.

The ink record has high quality, no running ink, and excellent temporal stability, thereby being preferably used in various applications as documents in which various texts and images are recorded.

EXAMPLES

Examples of the present invention are described hereinafter. However, the present invention is not limited to these examples. All percentages and parts are by mass unless indicated otherwise.

Preparation Example 1

—Preparation of Copper Phthalocyanine Pigment-containing Polymer Fine-particles Dispersion—

An additional test preparation was conducted with reference to Preparation Example 3 of Japanese Patent Application Laid-Open (JP-A) No. 2001-139849.

First, for preparing a polymer solution, the inside of a 1L flask equipped with a mechanical stirrer, a thermometer, a nitrogen gas inlet tube, a reflux tube, and a dropping funnel was sufficiently purged with nitrogen gas. Then, 11.2 g of styrene, 2.8 g of acrylic acid, 12.0 g of laurylmethacrylate, 4.0 g of polyethylene glycol methacrylate, 4.0 g of styrene macromer (by To a Gosei Co., Ltd., trade name: AS-6), and 0.4 g of mercaptoethanol were introduced and heated to 65° C. A mixed solution of 100.8 g of styrene, 25.2 g of acrylic acid, 108.0 g of layrylmethacrylate, 36.0 g of polyethylene glycol methacrylate, 60.0 g of hydroxyethylmethacrylate, 36.0 g of styrene macromer (by To a Gosei Co., Ltd., trade name: AS-6), 3.6 g of mercaptoethanol, 2.4 g of azobisdimethylvaleronitrile, and 18 g of methylethylketone was added in drops to the flask over 2.5 hours, following which a mixed solution of 0.8 g of azobisdimethylvaleronitrile and 18 g of methylethylketone was added in drops to the flask over 0.5 hour and allowed to mature at 65° C. for one hour. Zero point eight grams (0.8 g) of azobisdimethylvaleronitrile was added and allowed to mature for another one hour. After the reaction completed, 364 g of methylethylketone was added to the flask to obtain 800 g of a polymer solution having a concentration of 50% by mass. Then, part of the polymer solution was dried and the mass average molecular mass was measured by gel permeation chromatography (standard: polystyrene, solvent: tetrahydrofuran). The mass average molecular mass found was 15,000.

Twenty-eight grams (28 g) of the obtained polymer solution, 26 g of copper phthalocyanine pigment, 13.6 g of 1 mol/L aqueous potassium hydroxide, 20 g of methylethylketone, and 30 g of deionized water were well stirred and, then, kneaded with a triple roll mill (by Noritake Co., Ltd., trade name: NR-84A) 20 times. The obtained paste was introduced in 200 g of deionized water and well stirred. The methylethylketone and water were distilled away using an evaporator to obtain 160 g of a blue polymer fine-particles dispersion having a solid content of 20.0% by mass.

The obtained polymer fine-particles had a volume average particle diameter (D50%) of 93 nm as measured by a particle diameter distribution measuring device (Microtrac UPA, by Nikkiso Co., Ltd.).

Preparation Example 2

—Preparation of Dimethylquinacridone Pigment-containing Polymer Fine-particles Dispersion—

A purplish red polymer fine-particles dispersion was obtained in the same manner as in Preparation Example 1 except that the copper phthalocyanine pigment was replaced with a pigment C.I. Pigment Red 122.

The obtained polymer fine-particles had a volume average particle diameter (D50%) of 127 nm as measured by a particle diameter distribution measuring device (Microtrac UPA, by Nikkiso Co., Ltd.).

Preparation Example 3

—Preparation of Monoazo Yellow Pigment-containing Polymer Fine-particles Dispersion—

A yellow polymer fine-particles dispersion was obtained in the same manner as in Preparation Example 1 except that the copper phthalocyanine pigment was replaced with a pigment C.I. Pigment Yellow 74.

The obtained polymer fine-particles had a volume average particle diameter (D50%) of 76 nm as measured by a particle diameter distribution measuring device (Microtrac UPA, by Nikkiso Co., Ltd.).

Preparation Example 4

—Preparation of Carbon Black Dispersion—

Three hundred grams (300 g) of a commercially available pH2.5 acidic carbon black (by Cabot Corporation, trade name: Monak 1300) was well mixed with 1,000 ml of water. Then, 450 g of sodium hypochlorite (effective chlorine concentration 12%) was added in drops and stirred at 100° C. to 105° C. for eight hours. Then, 100 g of sodium hypochlorite (effective chlorine concentration 12%) was further added to the solution and dispersed for three hours in a horizontal dispersing machine.

The obtained slurry was diluted 10-fold with water and the pH was adjusted with lithium hydroxide. After demineralized and concentrated to a conductivity of 0.2 mS/cm by ultrafiltration membrane, a carbon black dispersion having a pigment concentration of 15% by mass was obtained. Larger particles were removed by centrifuge and the carbon black dispersion was further filtered by a nylon filter having an average pore diameter of 1 μm to obtain a carbon black dispersion.

The obtained polymer fine-particles had a volume average particle diameter (D50%) of 95 nm as measured by a particle diameter distribution measuring device (Microtrac UPA, by Nikkiso Co., Ltd.).

Preparation Example 5

—Preparation of Carbon Black Polymer Fine-particles Dispersion—

A black polymer fine-particles dispersion was obtained in the same manner as in Preparation Example 1 except that the copper phthalocyanine pigment was replaced with carbon black (by Degussa FW100).

The obtained polymer fine-particles had a volume average particle diameter (D50%) of 104 nm as measured by a particle diameter distribution measuring device (Microtrac UPA, by Nikkiso Co., Ltd.).

Preparation Example 6

—Preparation of Diazo Compound-treated Carbon Black Dispersion—

One hundred grams (10 g) of carbon black having a surface area of 230 $m^2$/g and a DBP oil absorption rate of 70 ml/100 g, 34 g of p-amino-N-benzoic acid, and 750 g of water were mixed and dispersed. 16 g of nitric acid was added in drops and stirred at 70° C. Five minutes after, a solution of 11 g of sodium nitrite in 50 g of water was added and stirred for another one hour. The obtained slurry was diluted 10-fold with water and centrifuged to remove larger particles, following which the pH was adjusted with diethanolamine to pH 8 to pH 9. After demineralization and concentrated by an ultrafiltration membrane, a carbon black dispersion having a pigment concentration of 15% by mass was obtained. The carbon black dispersion was further filtered by a polypropylene filter having an average pore diameter of 0.5 cm to obtain a carbon black dispersion.

The obtained carbon black dispersion had a volume average particle diameter (D50%) of 99 nm as measured by a particle diameter distribution measuring device (Microtrac UPA, by Nikkiso Co., Ltd.).

Preparation Example 7

—Preparation of Sulfonating Agent-treated Carbon Black Dispersion—

One-hundred fifty grams (150 g) of a commercially available carbon black pigment (by Degussa "Printex #85") was well mixed in 400 ml of sulfofuran and finely dispersed by a bead mill. Fifteen grams (15 g) of amidosulfuric acid was added and stirred at 140° C. to 150° C. for 10 hours. The obtained slurry was introduced in 1,000 ml of deionized water and centrifuged at 12,000 rpm to obtain a surface-treated carbon black wet cake. The obtained carbon black wet cake was again dispersed in 2,000 ml of deionized water and the pH was adjusted with lithium hydroxide. After demineralized and concentrated by ultra-filtration membrane, a carbon black dispersion having a pigment concentration of 10% by mass was obtained. The carbon black dispersion was further filtered by a nylon filter having an average pore diameter of 1 μm to obtain a carbon black dispersion.

The obtained carbon black dispersion had a volume average particle diameter (D50%) of 80 nm as measured by a particle diameter distribution measuring device (Microtrac UPA, by Nikkiso Co., Ltd.).

Preparation Example 8

—Preparation of Silicone-Modified Acrylic Resin Fine-Particles—

First, for preparing a resin solution, the inside of a 1L flask equipped with a mechanical stirrer, a thermometer, a nitrogen gas inlet tube, a reflux tube, and a dropping funnel was sufficiently purged with nitrogen gas. Then, 10 g of Aquaron RN-20 (by Dai-ichi Kogyo Seiyaku, Co., Ltd.), 1 g of potassium persulfate, and 286 g of purified water were introduced and heated to 65° C. A mixed solution of 150 g of methyl methacrylate, 100 g of 2-ethylhexyl acrylate, 20 g of acrylic acid, 20 g of vinyltriethoxysilane, 10 g of Aquaron RN-20, 4 g of potassium persulfate, and 398.3 g of purified water was added in drops to the flask over 2.5 hours. After allowed to mature at 80° C. for three hours, the flask was cooled to approximately 35° C. over one hour by running water approximately at 20° C. outside the flask. The pH was adjusted with potassium hydroxide to pH 7 to pH 8 to obtain 305 g of silicone-modified acrylic resin fine-particles.

The obtained resin fine-particles had a volume average particle diameter (D50%) of 130 nm as measured by a particle diameter distribution measuring device (Microtrac UPA, by Nikkiso Co., Ltd.).

The minimum film forming temperature (MFT) of the obtained resin fine-particles was measured according to JIS K 6828 using a temperature gradient heat plate minimum film forming temperature measuring device. Specifically, in the temperature gradient heat plate minimum film forming temperature measuring device, a temperature range suitable for the sample to be measured was assumed so that the minimum film forming temperature was observed at the center of the heat plate. The higher temperatures and the lower temperature were determined in the manner that the difference between the lowest and highest temperatures fell in a range between 20° C. and 40° C. The sample was quickly applied by an applicator from the higher to lower temperature side. The lowest temperature at which a continuous uniform film with no cracks was formed was read as the minimum film forming temperature. The minimum film forming temperature obtained was 0° C.

Preparation Example 9

—Preparation of Silicone-modified Acrylic Resin Fine-particles—

First, for preparing a resin solution, the inside of a 1L flask equipped with a mechanical stirrer, a thermometer, a nitrogen gas inlet tube, a reflux tube, and a dropping funnel was sufficiently purged with nitrogen gas. Then, 10 g of Aquaron RN-20 (by Dai-ichi Kogyo Seiyaku, Co., Ltd.), 1 g of potassium persulfate, and 286 g of purified water were introduced and heated to 65° C. A mixed solution of 150 g of methyl methacrylate, 100 g of 2-ethylhexyl acrylate, 20 g of acrylic acid, 40 g of hexyltrimethoxysilane, 10 g of Aquaron RN-20, 4 g of potassium persulfate, and 398.3 g of purified water was added in drops to the flask over 3 hours. After allowed to mature at 80° C. for three hours, the flask was cooled to approximately 35° C. over one hour by running water approximately at 20° C. outside the flask. The pH was adjusted with potassium hydroxide to pH 7 to pH 8 to obtain 318 g of silicone-modified acrylic resin fine-particles.

The obtained resin fine-particles had a volume average particle diameter (D50%) of 148 nm as measured by a particle size distribution measuring device (Microtrac UPA, by Nikkiso Co., Ltd.).

The minimum film forming temperature (MFT) of the obtained resin fine-particles was measured according to JIS K 6828 using a temperature gradient heat plate minimum film forming temperature measuring device. Specifically, in the temperature gradient heat plate minimum film forming temperature measuring device, a temperature range suitable for the sample to be measured was assumed so that the minimum film forming temperature was observed at the center of the heat plate. The higher temperatures and the lower temperature were determined in the manner that the difference between the lowest and highest temperatures fell in a range between 20° C. and 40° C. The sample was quickly applied by an applicator from the higher to lower temperature side. The lowest temperature at which a continuous uniform film with no cracks was formed was read as the minimum film forming temperature. The minimum film forming temperature obtained was 0° C.

Preparation Example 10

First, for preparing a resin solution, the inside of a 1L flask equipped with a mechanical stirrer, a thermometer, a nitrogen gas inlet tube, a reflux tube, and a dropping funnel was sufficiently purged with nitrogen gas. Then, 100 g of purified water, 3 g of sodium dodecylbenzenesulfonate, and 1 g of polyethylene glycol nonylphenylether were introduced, 1 g of ammonium persulfate and 0.2 g of sodium hydrogensulfite were added, and heated to 60° C. Then, 30 g of butyl acrylate, 40 g of methyl methacrylate, 19 g of butyl methacrylate, 10 g of vinylsilanetriolpotassium salt, and 1 g of 3-methacryloxypropylmethyldimethoxysilane were added in drops to the flask over three hours. Meanwhile, the pH of the polymerization solution was adjusted with aqueous ammonium to pH 7 to obtain 95 g of silicone-modified acrylic resin fine-particles.

The obtained resin fine-particles had a volume average particle diameter (D50%) of 160 nm as measured by a particle diameter distribution measuring device (Microtrac UPA, by Nikkiso Co., Ltd.).

Using the polymer fine-particles dispersion, carbon black dispersion, and resin fine-particles obtained in Preparation Examples 1 to 10, ink was produced as follows.

Production Example 1

—Production of Cyan Pigment Ink—

An ink composition having the following composition was produced and, then, filtered by a membrane filter with an average pore diameter 0.8 μm to prepare the ink of Production Example 1.

<Ink Composition>
- copper phthalocyanine pigment-containing polymer fine-particles dispersion of Preparation Example 1 . . . 20.0% by mass;
- 1,3-butanediol . . . 23.0% by mass;
- glycerin . . . 8.0% by mass;
- 2-ethyl-1,3-hexanediol . . . 2.0% by mass;
- fluorochemical surfactant having the following Structural Formula (1) . . . 1.0% by mass;

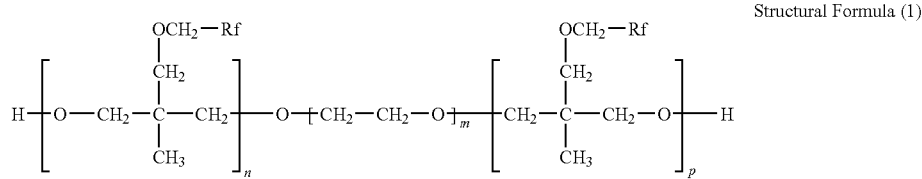

Structural Formula (1)

where, n=4, m=21, p=4, and Rf=$CF_2CF_3$;
Proxel LV (by Abesia Co., Ltd.) . . . 0.2% by mass; and
deionized water to be 100% by mass.

Production Example 2

—Production of Magenta Pigment Ink—

An ink composition having the following composition was produced and, then, filtered by a membrane filter with an average pore diameter 0.8 μm to prepare the ink of Production Example 2.

<Ink Composition>
- dimethylquinacridone pigment-containing polymer fine-particles dispersion of Preparation Example 2 . . . 20.0% by mass;
- 1,3-butanediol . . . 22.5% by mass;
- glycerin . . . 9.0% by mass;
- 2-ethyl-1,3-hexanediol . . . 2.0% by mass;
- fluorochemical surfactant having the following Structural Formula (1) . . . 1.0% by mass;

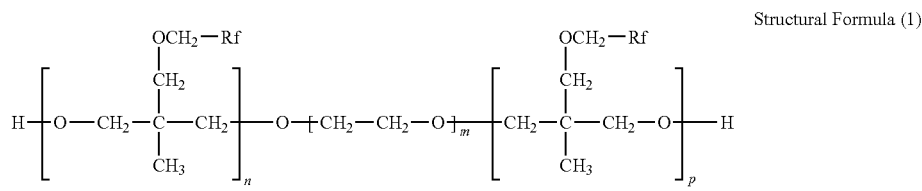

Structural Formula (1)

where, n=4, m=21, p=4, and Rf=$CF_2CF_3$;
Proxel LV (by Abesia Co., Ltd.) . . . 0.2% by mass; and
deionized water to be 100% by mass.

Production Example 3

—Production of Yellow Pigment Ink—

An ink composition having the following composition was produced and, then, filtered by a membrane filter with an average pore diameter 0.8 μm to prepare the ink of Production Example 3.

<Ink composition> monoazo yellow pigment-containing polymer fine-particles dispersion of Preparation Example 3 . . . 20.0% by mass;
1,6-hexanediol . . . 24.5% by mass;
glycerin . . . 8.0% by mass;
2-ethyl-1,3-hexanediol . . . 2.0% by mass;
fluorochemical surfactant having the following Structural Formula (1) . . . 0.5% by mass;

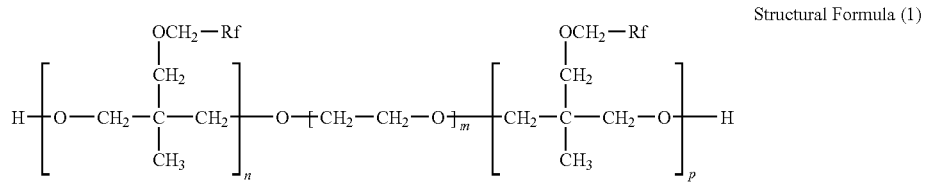

Structural Formula (1)

where, n=4, m=21, p=4, and Rf=$CF_2CF_3$;
Proxel LV (by Abesia Co., Ltd.) . . . 0.2% by mass; and
deionized water to be 100% by mass.

Production Example 4

—Production of Black Pigment Ink—

An ink composition having the following composition was produced and, then, filtered by a membrane filter with an average pore diameter 0.8 μm to prepare the ink of Production Example 4.

<Ink composition> carbon black dispersion of Preparation Example 7 . . . 20.0% by mass;
1,5-pentanediol . . . 22.5% by mass;
glycerin . . . 7.5% by mass;
2-pyrrolidone . . . 2.0% by mass;
2-ethyl-1,3-hexanediol . . . 2.0% by mass;
compound having the following formula . . . 1.0% by mass;

R—(OCH$_2$CH$_2$)$_n$OH where R: $C_{12}H_{23}$ (that may be branched), n=9;
fluorochemical surfactant having the following Structural Formula (1) . . . 0.1% by mass;

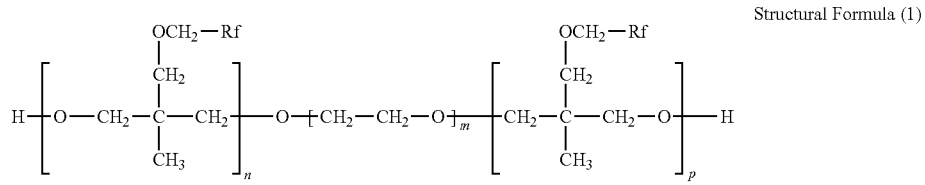

Structural Formula (1)

where, n=4, m=21, p=4, and Rf=$CF_2CF_3$; Proxel LV (by Abesia Co., Ltd.). 0.2% by mass; and
deionized water to be 100% by mass.

Production Example 5

—Production of Cyan Pigment Ink—

An ink composition having the following composition was produced and, then, filtered by a membrane filter with an average pore diameter 0.8 μm to prepare the ink of Production Example 5.

<Ink Composition>
- copper phthalocyanine pigment-containing polymer fine-particles dispersion of Preparation Example 1 . . . 20.0% by mass;
- 3-methyl-1,3-butanediol . . . 10.0% by mass;
- hexylene glycole . . . 4.0% by mass;
- glycerin . . . 8% by mass;
- 2-ethyl-1,3-hexanediol . . . 2.0% by mass;
- fluorochemical surfactant having the following Structural Formula (1) . . . 0.5% by mass;

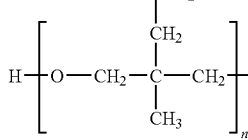

Structural Formula (1)

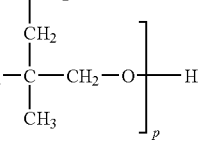

where, n=4, m=21, p=4, and Rf=$CF_2CF_3$;
Proxel LV (by Abesia Co., Ltd.) . . . 0.2% by mass; and
deionized water to be 100% by mass.

Production Example 6

—Production of Magenta Pigment Ink—

An ink composition having the following composition was produced and, then, filtered by a membrane filter with an average pore diameter 0.8 μm to prepare the ink of Production Example 6.

<Ink Composition>
- dimethylquinacridone pigment-containing polymer fine-particles dispersion of Preparation Example 2 . . . 20.0% by mass;
- 3-methyl-1,3-butanediol . . . 11.5% by mass;
- ethylene glycol . . . 5.0% by mass;
- glycerin . . . 7.5% by mass;
- 2-ethyl-1,3-hexanediol . . . 2.0% by mass;
- fluorochemical surfactant having the following Structural Formula . . . 0.5% by mass;

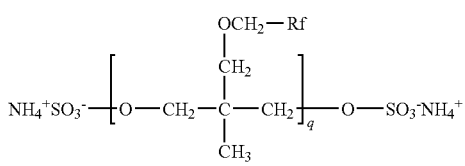

where, q=6, and Rf=$CF_2CF_3$;
Proxel LV (by Abesia Co., Ltd.) . . . 0.2% by mass; and
deionized water to be 100% by mass.

Preparation Example 7

—Preparation of Yellow Pigment Ink—

An ink composition having the following composition was produced and, then, filtered by a membrane filter with an average pore diameter 0.8 μm to prepare the ink of Production Example 7.

<Ink Composition>
- C.I. Acid Yellow 23 . . . 4.0% by mass;
- 3-methyl-1,3-butanediol . . . 20.0% by mass;
- 1,3-butanediol . . . 8.5% by mass;
- glycerin . . . 7.5% by mass;
- 2-ethyl-1,3-hexanediol . . . 2.0% by mass;
- fluorochemical surfactant having the following Structural Formula . . . 0.5% by mass;

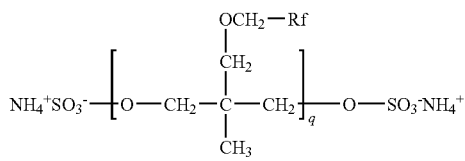

where, q=6, and Rf=$CF_2CF_3$;
Proxel LV (by Abesia Co., Ltd.) . . . 0.2% by mass; and
deionized water to be 100% by mass.

Production Example 8

—Production of Black Pigment Ink—

An ink composition having the following composition was produced and, then, filtered by a membrane filter with an average pore diameter 0.8 μm to prepare the ink of Production Example 8.

<Ink Composition>
- carbon black polymer fine-particles dispersion of Preparation Example 5 . . . 5.0% by mass;
- 2-methyl-2,4-pentanediol . . . 11.5% by mass;
- 3-methyl-1,3-butanediol . . . 13.0% by mass;
- glycerin . . . 7.5% by mass;
- 2-pyrrolidone . . . 2.0% by mass;
- Unisafe A-LY (by NOF Corporation, amphoteric surfactant) . . . 2.0% by mass;
- fluorochemical surfactant having the following Structural Formula . . . 0.5% by mass;

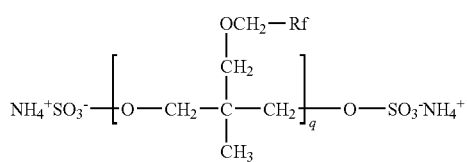

where, q=6, and Rf=CF₃;
2,2,4-trimethyl-1,3-pentanediol . . . 2.0% by mass;
Proxel LV (by Abesia Co., Ltd.) . . . 0.2% by mass; and
deionized water to be 100% by mass.

Production Example 9

—Production of Cyan Pigment Ink—

An ink composition having the following composition was produced and, then, filtered by a membrane filter with an average pore diameter 0.8 μm to prepare the ink of Production Example 9.

<Ink Composition>
copper phthalocyanine pigment-containing polymer fine-particles dispersion of Preparation Example 1 . . . 20.0% by mass;
3-methyl-1,5-pentanediol . . . 10.5% by mass.
3-methyl-1,3-butanediol . . . 13.0% by mass.
glycerin . . . 8.0% by mass;
2,2,4-trimethyl-1,3-pentanediol . . . 2.0% by mass.
Unisafe A-LM (by NOF Corporation, amphoteric surfactant) . . . 2.0% by mass;
fluorochemical surfactant having the following Structural Formula . . . 0.5% by mass;

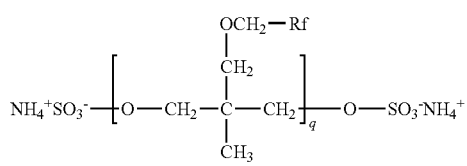

where, q=6, and Rf=CF₃;
Proxel LV (by Abesia Co., Ltd.) . . . 0.2% by mass; and
deionized water to be 100% by mass.

Production Example 10

—Production of Magenta Pigment Ink—

An ink composition having the following composition was produced and, then, filtered by a membrane filter with an average pore diameter 0.8 μm to prepare the ink of Production Example 10.

<Ink Composition>
dimethylquinacridone pigment-containing polymer fine-particles dispersion of Preparation Example 2 . . . 20.0% by mass;
3-methyl-1,5-pentanediol . . . 5.0% by mass;
3-methyl-1,3-butanediol . . . 5.0% by mass;
glycerin . . . 10.0% by mass;
2,2,4-trimethyl-1,3-pentanediol . . . 2.0% by mass;
fluorochemical surfactant having the following Structural Formula (1) . . . 0.1% by mass;

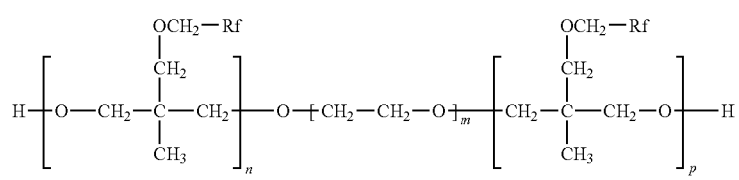

Structural Formula (1)

where, n=4, m=21, p=4, and Rf=CF₂CF₃;
ECTD-3NEX (by Nikko Chemicals Co., Ltd., anionic surfactant) . . . 1.0% by mass;
Proxel LV (by Abesia Co., Ltd.) . . . 0.2% by mass; and
deionized water to be 100% by mass.

Production Example 11

—Preparation of Yellow Pigment Ink—

An ink composition having the following composition was produced and, then, filtered by a membrane filter with an average pore diameter 0.8 μm to prepare the ink of Production Example 11.

<Ink Composition>
monoazo yellow pigment-containing polymer fine-particles dispersion of Preparation Example 3 . . . 20.0% by mass;

3-methyl-1,5-pentanediol . . . 12.5% by mass;
3-methyl-1,3-butanediol . . . 15.0% by mass;
glycerin . . . 7.0% by mass;
2,2,4-trimethyl-1,3-pentanediol . . . 2.0% by mass;
fluorochemical surfactant having the following Structural Formula (1) . . . 0.1% by mass;

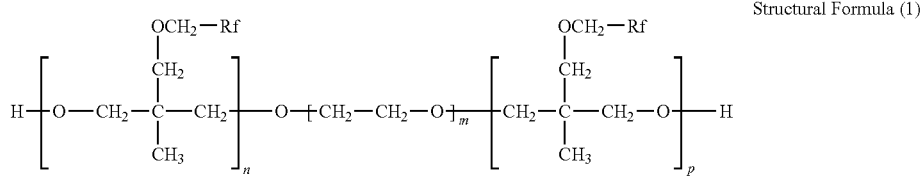

Structural Formula (1)

where, n=4, m=21, p=4, and Rf=CF$_2$CF$_3$;
Proxel LV (by Abesia Co., Ltd.) . . . 0.2% by mass; and
deionized water to be 100% by mass.

Production Example 12

—Production of Black Pigment Ink—

An ink composition having the following composition was produced and, then, filtered by a membrane filter with an average pore diameter 0.8 μm to prepare the ink of Production Example 12.

<Ink Composition>
carbon black dispersion of Preparation Example 6 . . . 20.0% by mass;

3-methyl-1,3-butanediol . . . 12.5% by mass;
glycerin . . . 7.5% by mass;
2-pyrrolidone . . . 2.0% by mass;
2-ethyl-1,3-hexanediol . . . 2.0% by mass;
compound having the following formula . . . 2.0% by mass;

R—(OCH$_2$CH$_2$)$_n$OH where R: C$_{12}$H$_{23}$ (that may be branched), n=9;

fluorochemical surfactant having the following Structural Formula (1) . . . 0.1% by mass;

where, n=4, m=21, p=4, and Rf=CF$_2$CF$_3$;
Proxel LV (by Abesia Co., Ltd.) . . . 0.2% by mass; and
deionized water to be 100% by mass.

Production Example 13

—Production of Black Pigment Ink—

An ink composition having the following composition was produced and, then, filtered by a membrane filter with an average pore diameter 0.8 μm to prepare the ink of Production Example 13.

<Ink Composition>
carbon black dispersion of Preparation Example 5 . . . 20.0% by mass;

3-methyl-1,3-butanediol . . . 22.5% by mass;
glycerin . . . 7.5% by mass;
2-pyrrolidone . . . 2.0% by mass;
2-ethyl-1,3-hexanediol . . . 2.0% by mass;

fluorochemical surfactant having the following Structural Formula (1) . . . 0.5% by mass;

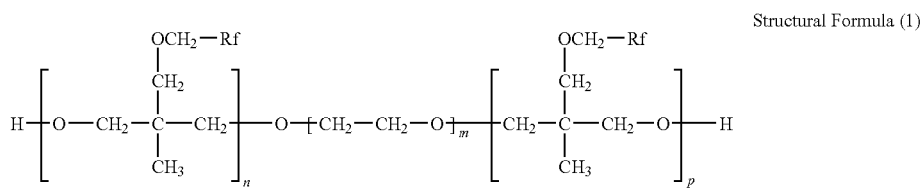

Structural Formula (1)

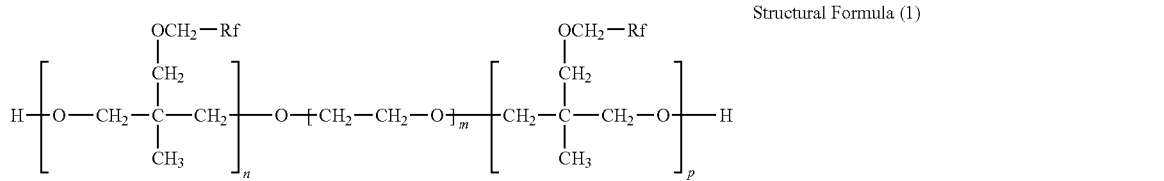

Structural Formula (1)

where, n=4, m=21, p=4, and Rf=CF$_2$CF$_3$;
Proxel LV (by Abesia Co., Ltd.) . . . 0.2% by mass; and
deionized water to be 100% by mass.

Production Example 14

—Production of Black Pigment Ink—
An ink composition having the following composition was produced and, then, filtered by a membrane filter with an average pore diameter 0.8 μm to prepare the ink of Production Example 14.

<Ink Composition>
carbon black dispersion of Preparation Example 4 . . . 20.0% by mass;
3-methyl-1,3-butanediol . . . 17.5% by mass;
glycerin . . . 5.5% by mass;
2-pyrrolidone . . . 2.0% by mass;
2-ethyl-1,3-hexanediol . . . 2.0% by mass;
fluorochemical surfactant having the following Structural Formula (1) . . . 0.1% by mass;

Production Example 15

—Production of Cyan Pigment Ink—
An ink composition having the following composition was produced and, then, filtered by a membrane filter with an average pore diameter 0.8 μm to prepare the ink of Production Example 15.

<Ink Composition>
monoazo yellow pigment-containing polymer fine-particles dispersion of Preparation Example 3 . . . 20.0% by mass;
3-methyl-1,5-pentanediol . . . 12.5% by mass;
3-methyl-1,3-butanediol . . . 15.0% by mass;
glycerin . . . 7.0% by mass;

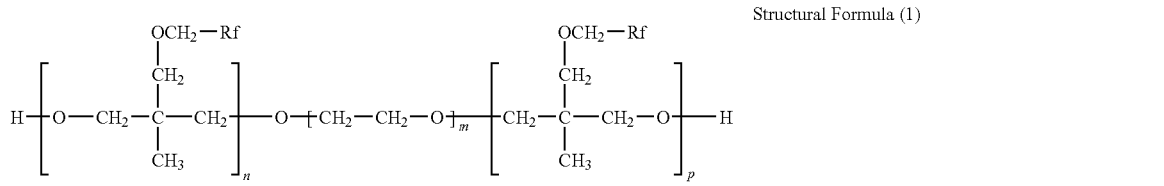

Structural Formula (1)

where, n=4, m=21, p=4, and Rf=CF$_2$CF$_3$;

Proxel LV (by Abesia Co., Ltd.) . . . 0.2% by mass; and
deionized water to be 100% by mass.

2,2,4-trimethyl-1,3-pentanediol . . . 2.0% by mass;

fluorochemical surfactant having the following Structural Formula (1) . . . 0.1% by mass;

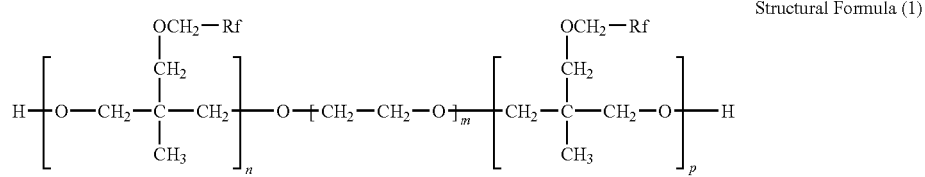

Structural Formula (1)

where, n=4, m=21, p=4, and Rf=$C_4F_9$;
Proxel LV (by Abesia Co., Ltd.) . . . 0.2% by mass; and
deionized water to be 100% by mass.

Production Example 16

—Production of Cyan Pigment Ink—

An ink composition having the following composition was produced and, then, filtered by a membrane filter with an average pore diameter 0.8 μm to prepare the ink of Production Example 16.

<Ink Composition>
copper phthalocyanine pigment-containing polymer fine-particles dispersion of Preparation Example 1 . . . 20.0% by mass;
1,3-butanediol . . . 23.0% by mass.
glycerin . . . 8.0% by mass;
2-ethyl-1,3-hexanediol . . . 2.0% by mass;
fluorochemical surfactant having the following Structural Formula (3-1) . . . 1.0% by mass;

Structural Formula (3-1)

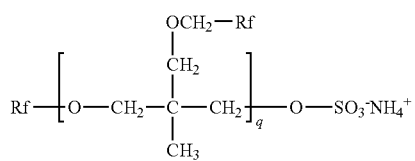

where, q=6, and Rf=$CF_2CF_3$;
Proxel LV (by Abesia Co., Ltd.) . . . 0.2% by mass; and
deionized water to be 100% by mass.

Production Example 17

—Production of Magenta Pigment Ink—

An ink composition having the following composition was produced and, then, filtered by a membrane filter with an average pore diameter 0.8 μm to prepare the ink of Production Example 17.

<Ink Composition>
dimethylquinacridone pigment-containing polymer fine-particles dispersion of Preparation Example 2 . . . 20.0% by mass;
3-methyl-1,3-butanediol . . . 22.5% by mass;
glycerin . . . 9.0% by mass;
2-ethyl-1,3-hexanediol . . . 2.0% by mass;
fluorochemical surfactant having the following Structural Formula (3-1) . . . 1.0% by mass;

Structural Formula (3-1)

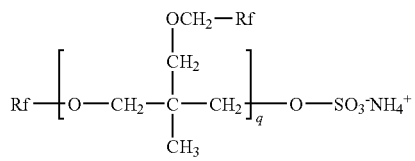

where, q=6, and Rf=$CF_3$;
Proxel LV (by Abesia Co., Ltd.) . . . 0.2% by mass; and
deionized water to be 100% by mass.

Production Example 18

—Production of Yellow Pigment Ink—

An ink composition having the following composition was produced and, then, filtered by a membrane filter with an average pore diameter 0.8 μm to prepare the ink of Production Example 18.

<Ink Composition>
monoazo yellow pigment-containing polymer fine-particles dispersion of Preparation Example 3 . . . 20.0% by mass;
1,6-hexane-diol . . . 24.5% by mass;
glycerin . . . 8.0% by mass;
2-ethyl-1,3-hexanediol . . . 2.0% by mass;
fluorochemical surfactant having the following Structural Formula (3-1) . . . 0.5% by mass;

Structural Formula (3-1)

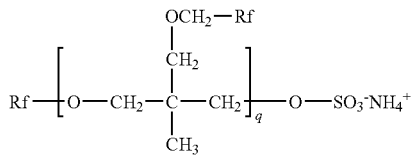

where, q=6, and Rf=$CF_3$;
Proxel LV (by Abesia Co., Ltd.) . . . 0.2% by mass; and
deionized water to be 100% by mass.

Production Example 19

—Production of Black Pigment Ink—

An ink composition having the following composition was produced and, then, filtered by a membrane filter with an average pore diameter 0.8 μm to prepare the ink of Production Example 19.

<Ink Composition>
carbon black dispersion of Preparation Example 7 . . . 20.0% by mass;
1,5-pentanediol . . . 22.5% by mass;
glycerin . . . 7.5% by mass;
2-pyrrolidone . . . 2.0% by mass;
2-ethyl-1,3-hexanediol . . . 2.0% by mass;
compound having the following formula . . . 1.0% by mass;

R—(OCH$_2$CH$_2$)$_n$OH where R: $C_{12}H_{23}$ (that may be branched), n=9;
fluorochemical surfactant having the following Structural Formula (3-1) . . . 0.1% by mass;

Structural Formula (3-1)

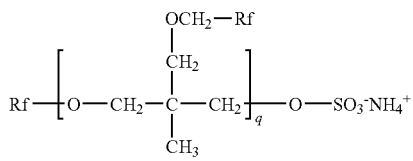

where, q=4, and Rf=$CF_3$;
Proxel LV (by Abesia Co., Ltd.) . . . 0.2% by mass; and
deionized water to be 100% by mass.

Production Example 20

—Production of Cyan Pigment Ink—

An ink composition having the following composition was produced and, then, filtered by a membrane filter with an average pore diameter 0.8 μm to prepare the ink of Production Example 20.

<Ink Composition>
- copper phthalocyanine pigment-containing polymer fine-particles dispersion of Preparation Example 1 . . . 20.0% by mass;
- 3-methyl-1,3-butanediol . . . 10.0% by mass;
- hexylene glycole . . . 4.0% by mass;
- glycerin . . . 8.0% by mass;
- 2-ethyl-1,3-hexanediol . . . 2.0% by mass;
- fluorochemical surfactant having the following Structural Formula (3-1) . . . 0.5% by mass;

Structural Formula (3-1)

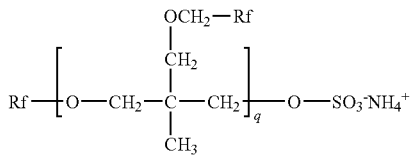

where, q=6, and Rf=$CF_2CF_3$;
- Proxel LV (by Abesia Co., Ltd.) . . . 0.2% by mass;
- fine-particles of Preparation Example 10 . . . 5.0% by mass; and
- deionized water to be 100% by mass.

Production Example 21

—Production of Magenta Pigment Ink—

An ink composition having the following composition was produced and, then, filtered by a membrane filter with an average pore diameter 0.8 μm to prepare the ink of Production Example 21.

<Ink Composition>
- dimethylquinacridone pigment-containing polymer fine-particles dispersion of Preparation Example 2 . . . 20.0% by mass;
- 3-methyl-1,3-butanediol . . . 11.5% by mass;
- ethylene glycol . . . 5.0% by mass;
- glycerin . . . 7.5% by mass;
- 2-ethyl-1,3-hexanediol . . . 2.0% by mass;
- fluorochemical surfactant having the following Structural Formula (3-1) . . . 0.1% by mass;

Structural Formula (3-1)

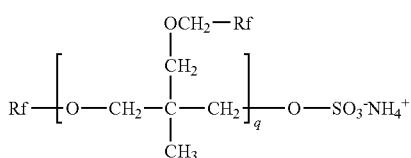

where, q=6, and Rf=$CF_2CF_3$;
- Proxel LV (by Abesia Co., Ltd.) . . . 0.2% by mass;
- fine-particles of Preparation Example 9 . . . 5.0% by mass; and
- deionized water to be 100% by mass.

Preparation Example 22

—Preparation of Yellow Pigment Ink—

An ink composition having the following composition was produced and, then, filtered by a membrane filter with an average pore diameter 0.8 μm to prepare the ink of Production Example 22.

<Ink Composition>
- C.I. Acid Yellow 23 . . . 4.0% by mass;
- 3-methyl-1,3-butanediol . . . 20.0% by mass;
- 1,3-butanediol . . . 8.5% by mass;
- glycerin . . . 7.5% by mass;
- 2-ethyl-1,3-hexanediol . . . 2.0% by mass;
- fluorochemical surfactant having the following Structural Formula (3-1) . . . 0.5% by mass;

Structural Formula (3-1)

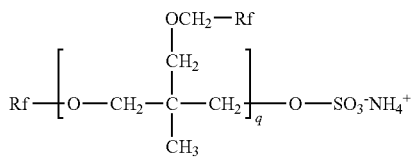

where, q=6, and Rf=$CF_2CF_3$;
- Proxel LV (by Abesia Co., Ltd.) . . . 0.2% by mass;
- fine-particles of Preparation Example 8 . . . 5.0% by mass; and
- a deionized water to be 100% by mass.

Production Example 23

—Production of Black Pigment Ink—

An ink composition having the following composition was produced and, then, filtered by a membrane filter with an average pore diameter 0.8 μm to prepare the ink of Production Example 23.

<Ink Composition>
- carbon black dispersion of Preparation Example 5 . . . 5.0% by mass;
- 2-methyl-2,4-pentanediol . . . 11.5% by mass;
- 3-methyl-1,3-butanediol . . . 13.0% by mass;
- glycerin . . . 7.5% by mass;
- 2-pyrrolidone . . . 2.0% by mass;
- Unisafe A-LY (by NOF Corporation, amphoteric surfactant) . . . 2.0% by mass;
- fluorochemical surfactant having the following Structural Formula (3-1) . . . 0.5% by mass;

Structural Formula (3-1)

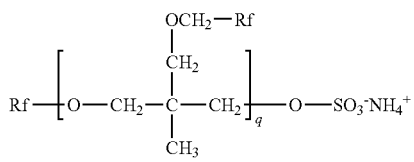

where, q=6, and Rf=CF$_2$CF$_3$;
2,2,4-trimethyl-1,3-pentanediol . . . 2.0% by mass;
Proxel LV (by Abesia Co., Ltd.) . . . 0.2% by mass;
fine-particles of Preparation Example 10 . . . 5% by mass; and
deionized water to be 100% by mass.

Production Example 24

—Production of Cyan Pigment Ink—
An ink composition having the following composition was produced and, then, filtered by a membrane filter with an average pore diameter 0.8 μm to prepare the ink of Production Example 24.

<Ink Composition>
copper phthalocyanine pigment-containing polymer fine-particles dispersion of Preparation Example 1 . . . 20.0% by mass;
3-methyl-1,5-pentanediol . . . 10.5% by mass;
3-methyl-1,3-butanediol . . . 13.0% by mass;
glycerin . . . 8.0% by mass;
2,2,4-trimethyl-1,3-pentanediol . . . 2.0% by mass;
Unisafe A-LM (by NOF Corporation, amphoteric surfactant) . . . 2.0% by mass;
fluorochemical surfactant having the following Structural Formula (3) . . . 0.1% by mass;

Structural Formula (3)

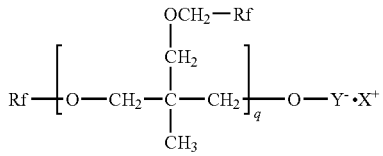

where, X=N(CH$_3$)C$_3$H$_7$, Y=OSO$_3$, q=6, and Rf=CF$_2$CF$_3$;
Proxel LV (by Abesia Co., Ltd.) . . . 0.2% by mass;
fine-particles of Preparation Example 8 . . . 5.0% by mass; and
deionized water to be 100% by mass.

Production Example 25

—Production of Magenta Pigment Ink—
An ink composition having the following composition was produced and, then, filtered by a membrane filter with an average pore diameter 0.8 μm to prepare the ink of Production Example 25.

<Ink Composition>
dimethylquinacridone pigment-containing polymer fine-particles dispersion of Preparation Example 2 . . . 20.0% by mass;
3-methyl-1,5-pentanediol . . . 5.0% by mass;
3-methyl-1,3-butanediol . . . 5.0% by mass;
glycerin . . . 10.0% by mass;
2,2,4-trimethyl-1,3-pentanediol . . . 2.0% by mass;
fluorochemical surfactant having the following Structural Formula (3-1) . . . 1.0% by mass;

Structural Formula (3-1)

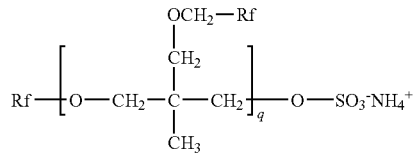

where, q=6, and Rf=CF$_2$CF$_3$;
ECTD-3NEX (by Nikko Chemicals Co., Ltd., anionic surfactant) . . . 1.0% by mass;
Proxel LV (by Abesia Co., Ltd.) . . . 0.2% by mass; and
fine-particles of Preparation Example 10 . . . 5% by mass; and
deionized water to be 100% by mass.

Production Example 26

—Production of Yellow Pigment Ink—
An ink composition having the following composition was produced and, then, filtered by a membrane filter with an average pore diameter 0.8 μm to prepare the ink of Production Example 26.

<Ink Composition>
monoazo yellow pigment-containing polymer fine-particles dispersion of Preparation Example 3 . . . 20.0% by mass;
3-methyl-1,3-butanediol . . . 15.0% by mass;
glycerin . . . 7.0% by mass;
2,2,4-trimethyl-1,3-pentanediol . . . 2.0% by mass;
fluorochemical surfactant having the following Structural Formula (3-1) . . . 1.0% by mass;

Structural Formula (3-1)

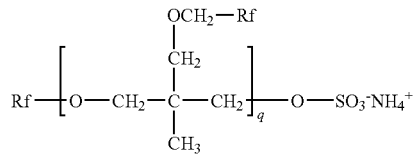

where, q=6, and Rf=CF$_3$;
Proxel LV (by Abesia Co., Ltd.) . . . 0.2% by mass; and
fine-particles of Preparation Example 10 . . . 10.0% by mass; and
deionized water to be 100% by mass.

Production Example 27

—Production of Black Pigment Ink—
An ink composition having the following composition was produced and, then, filtered by a membrane filter with an average pore diameter 0.8 μm to prepare the ink of Production Example 27.

<Ink Composition>
carbon black dispersion of Preparation Example 6 . . . 20.0% by mass;
3-methyl-1,3-butanediol . . . 12.5% by mass;
glycerin . . . 7.5% by mass;
2-pyrrolidone . . . 2.0% by mass;
2-ethyl-1,3-hexanediol . . . 2.0% by mass;

fluorochemical surfactant having the following Structural Formula (3-1) . . . 1.0% by mass;

Structural Formula (3-1)

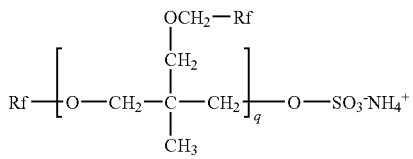

where, q=6, and Rf=CF$_3$;
Proxel LV (by Abesia Co., Ltd.) . . . 0.2% by mass; and
fine-particles of Preparation Example 10 . . . 10% by mass; and
deionized water to be 100% by mass.

Production Example 28

—Production of Black Pigment Ink—
An ink composition having the following composition was produced and, then, filtered by a membrane filter with an average pore diameter 0.8 μm to prepare the ink of Production Example 28.
<Ink Composition>
 carbon black dispersion of Preparation Example 5 . . . 20.0% by mass;
 3-methyl-1,3-butanediol . . . 22.5% by mass;
 glycerin . . . 7.5% by mass;
 2-pyrrolidone . . . 2.0% by mass;
 2-ethyl-1,3-hexanediol . . . 2.0% by mass;
 fluorochemical surfactant having the following Structural Formula (3) . . . 0.1% by mass;

Structural Formula (3)

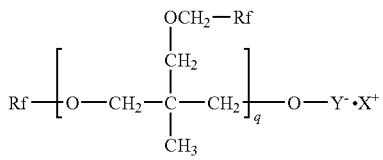

where, X=N(CH$_3$)C$_3$H$_7$, Y—OSO$_3$, q=6, and Rf=CF$_2$CF$_3$;
Proxel LV (by Abesia Co., Ltd.) . . . 0.2% by mass;
fine-particles of Preparation Example 10 . . . 4.0% by mass; and
deionized water to be 100% by mass.

Production Example 29

—Production of Black Pigment Ink—
An ink composition having the following composition was produced and, then, filtered by a membrane filter with an average pore diameter 0.8 μm to prepare the ink of Production Example 29.
<Ink Composition>
 carbon black dispersion of Preparation Example 4 . . . 20.0% by mass;
 3-methyl-1,3-butanediol . . . 17.5% by mass;
 glycerin . . . 5.5% by mass;
 2-pyrrolidone . . . 2.0% by mass;
 2-ethyl-1,3-hexanediol . . . 2.0% by mass;
 fluorochemical surfactant having the following Structural Formula (3-1) . . . 1.0% by mass;

Structural Formula (3-1)

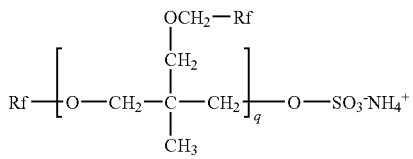

where, q=6, and Rf=CF$_3$;
Proxel LV (by Abesia Co., Ltd.) . . . 0.2% by mass; and
deionized water to be 100% by mass.

Comparative Production Example 1

—Production of Cyan Pigment Ink—
The ink of Comparative Production Example 1 was prepared in the same manner as in Production Example 1 except that the fluorochemical surfactant having the Structural Formula (1) was replaced with ECTD-3NEX (by Nikko Chemicals Co., Ltd., anionic surfactant).

Comparative Production Example 2

—Production of Magenta Pigment Ink—
The ink of Comparative Production Example 2 was prepared in the same manner as in Production Example 2 except that the fluorochemical surfactant having the Structural Formula (1) was replaced with ECTD-6NEX (by Nikko Chemicals Co., Ltd., anionic surfactant).

Comparative Production Example 3

—Production of Yellow Pigment Ink—
The ink of Comparative Production Example 3 was prepared in the same manner as in Production Example 3 except that the fluorochemical surfactant having the Structural Formula (1) was replaced with Unisafe A-LV (by NOF Corporation, amphoteric surfactant).

Comparative Production Example 4

—Production of Black Pigment Ink—
The ink of Comparative Production Example 4 was prepared in the same manner as in Production Example 4 except that the fluorochemical surfactant having the Structural Formula (1) was replaced with Nissan Anon BL-SF (by NOF Corporation, amphoteric surfactant).

Comparative Production Example 5

—Production of Cyan Pigment Ink—
The ink of Comparative Production Example 5 was prepared in the same manner as in Production Example 5 except that the fluorochemical surfactant having the Structural Formula (1) was replaced with ECTD-3NEX (by Nikko Chemicals Co., Ltd., anionic surfactant).

Comparative Production Example 6

—Production of Magenta Pigment Ink—

The ink of Comparative Production Example 6 was prepared in the same manner as in Production Example 6 except that the fluorochemical surfactant having the Structural Formula (2) was replaced with ECTD-3NEX (by Nikko Chemicals Co., Ltd., anionic surfactant).

Examples A-1 to A-17 and Comparative Examples A-1 to A-4

Using the inks of Production Examples 1 to 29 and Comparative Production Examples 1 to 6 in combinations shown in Table 1, ink sets of Examples A-1 to A-17 and Comparative Examples A-1 to A-4 were prepared in a conventional technique.

<Printer Used>

Figure 3:
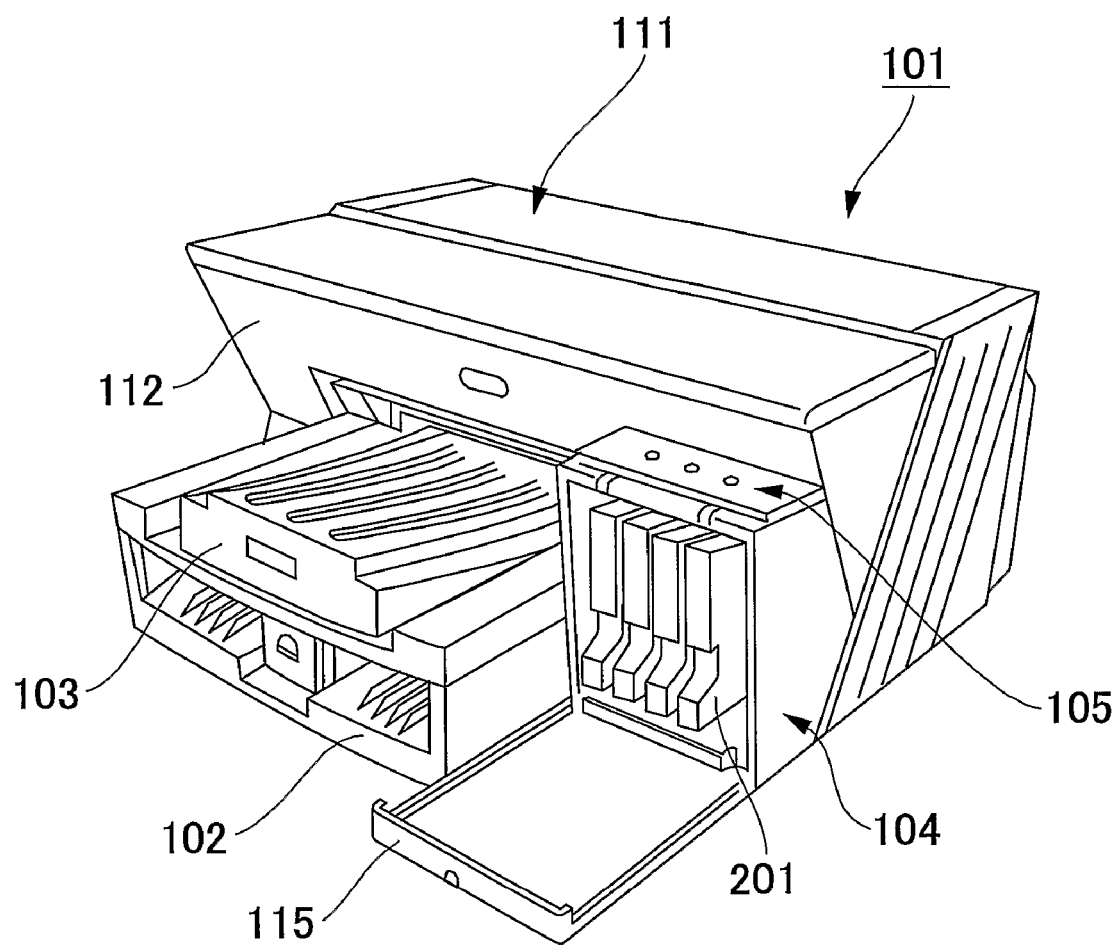
FIG. 3 is a perspective view of an example of the ink cartridge mounting part of an inkjet recording apparatus when the cover is opened for explanation.

Printing was conducted on the following regular paper using the inkjet printer shown in FIGS. 3 to 5 (by Ricoh Company, Ltd., IPSiO G707).

<Paper Used for Printing>

The test print paper was My Paper (by NBS Ricoh Company, Ltd.).

<Evaluation 1. Color Image Evaluation—Color Development Evaluation (Solor Saturation)>

Printing was conducted on My Paper (by NBS Ricoh Company, Ltd.) using the inkjet printer shown in FIGS. 3 to 5 (by Ricoh Company, Ltd., IPSiO G707). The print pattern included 100% duty printing of yellow, magenta, and cyan color inks. The print conditions included a recording density of 360 dpi and one-pass printing.

TABLE 1

|  | Ink Set | | | |
| --- | --- | --- | --- | --- |
|  | Cyan Ink | Yellow Ink | Magenta Ink | Black Ink |
| Example A-1 | Production Example 1 | Production Example 3 | Production Example 2 | Production Example 4 |
| Example A-2 | Production Example 5 | Production Example 11 | Production Example 6 | Production Example 8 |
| Example A-3 | Production Example 9 | Production Example 11 | Production Example 10 | Production Example 12 |
| Example A-4 | Production Example 1 | Production Example 11 | Production Example 10 | Production Example 13 |
| Example A-5 | Production Example 5 | Production Example 3 | Production Example 2 | Production Example 14 |
| Example A-6 | Production Example 1 | Production Example 3 | Production Example 2 | Production Example 8 |
| Example A-7 | Production Example 5 | Production Example 11 | Production Example 6 | Production Example 4 |
| Example A-8 | Production Example 1 | Production Example 3 | Production Example 2 | Production Example 12 |
| Example A-9 | Production Example 5 | Production Example 3 | Production Example 10 | Production Example 4 |
| Example A-10 | Production Example 9 | Production Example 3 | Production Example 2 | Production Example 8 |
| Example A-11 | Production Example 5 | Production Example 7 | Production Example 10 | Production Example 4 |
| Example A-12 | Production Example 9 | Production Example 15 | Production Example 2 | Production Example 8 |
| Example A-13 | Production Example 16 | Production Example 22 | Production Example 21 | Production Example 27 |
| Example A-14 | Production Example 24 | Production Example 18 | Production Example 25 | Production Example 28 |
| Example A-15 | Production Example 16 | Production Example 26 | Production Example 17 | Production Example 19 |
| Example A-16 | Production Example 20 | Production Example 26 | Production Example 21 | Production Example 29 |
| Example A-17 | Production Example 24 | Production Example 22 | Production Example 25 | Production Example 23 |
| Comp. Ex. A-1 | Comp. Production Example 1 | Comp. Production Example 3 | Comp. Production Example 2 | Comp. Production Example 4 |
| Comp. Ex. A-2 | Comp. Production Example 5 | Comp. Production Example 3 | Comp. Production Example 6 | Comp. Production Example 4 |
| Comp. Ex. A-3 | Comp. Production Example 1 | Comp. Production Example 3 | Comp. Production Example 6 | Comp. Production Example 4 |
| Comp. Ex. A-4 | Comp. Production Example 5 | Comp. Production Example 3 | Comp. Production Example 2 | Comp. Production Example 4 |

After drying, the yellow, magenta, and cyan solid color image parts were measured by a reflection color spectral colorimetry densitometer (by X-Rite K.K.) to obtain coordinates on the L*a*b* color system for the color difference indication defined by CIE (Commision International de l'Eclairage). The color saturation C* expressed by the equation $C^* = \{(a^*)^2 + (b^*)^2\}^{1/2}$ was obtained for each color. Higher color saturation values C* indicate better color development, by which the ink is capable of forming a highly uniform solid image part. The results are shown in Table 2.

TABLE 2

| | Color Saturation C* | | |
|---|---|---|---|
| | Yellow Ink | Magenta Ink | Cyan Ink |
| Example A-1 | 80.09 | 61.42 | 51.07 |
| Example A-2 | 82.24 | 60.43 | 51.35 |
| Example A-3 | 82.35 | 61.58 | 50.75 |
| Example A-4 | 82.37 | 61.68 | 51.16 |
| Example A-5 | 80.01 | 61.49 | 51.46 |
| Example A-6 | 80.06 | 61.54 | 51.09 |
| Example A-7 | 82.19 | 60.49 | 51.39 |
| Example A-8 | 80.99 | 61.39 | 51.13 |
| Example A-9 | 80.07 | 61.63 | 51.42 |
| Example A-10 | 80.06 | 61.35 | 50.88 |
| Example A-11 | 83.07 | 61.63 | 51.42 |
| Example A-12 | 79.96 | 61.35 | 50.88 |
| Example A-13 | 80.05 | 61.61 | 51.52 |
| Example A-14 | 79.65 | 61.72 | 51.11 |
| Example A-15 | 81.07 | 61.62 | 51.67 |
| Example A-16 | 80.98 | 61.52 | 51.23 |
| Example A-17 | 79.97 | 61.67 | 51.05 |
| Comp. Ex. A-1 | 76.73 | 57.02 | 48.62 |
| Comp. Ex. A-2 | 76.68 | 58.22 | 49.11 |
| Comp. Ex. A-3 | 76.61 | 58.14 | 48.57 |
| Comp. Ex. A-4 | 76.60 | 57.04 | 49.23 |

<Evaluation 2. Discharge Stability Evaluation in Intermittent Printing>

Printing was conducted on My Paper (by NBS Ricoh Company, Ltd.) using the inkjet printer shown in FIGS. 3 to 5 (by Ricoh Company, Ltd., IPSiO G707). The print pattern included a chart containing 5% print area in a total area of the paper within the image region being printed at 100% duty in yellow, magenta, cyan, and black inks. The print conditions included a recording density of 360 dpi and one-pass printing.

Evaluation 2 followed Evaluation 1 for each ink set of the above Examples and Comparative Examples.

In intermittent printing, the chart was continuously printed on 200 sheets of paper and, then, the printing was paused for 20 minutes. This operation was repeated 50 times. After a total of 1,000 printings, the chart was printed one more time and visually evaluated for the presence of streaking, white spots, and disturbed jet according to the following criteria. The results are shown in Table 3.

[Evaluation Criteria]
A: no streaking, white spots, or disturbed jet in the solid parts;
B: slight streaking, white spots, or disturbed jet is observed in the solid parts;
C: streaking, white spots, or disturbed jet is observed in the first scan; and
D: streaking, white spots, or disturbed jet is observed throughout the solid parts.

<Evaluation 3. Bleed Evaluation Between Color Ink and Black Ink>

Printing was conducted on My Paper (by NBS Ricoh Company, Ltd.) using the inkjet printer shown in FIGS. 3 to 5 (by Ricoh Company, Ltd., IPSiO G707). The print pattern included 100% duty printing in yellow ink. Then, black ink printing was conducted in the obtained yellow solid image part. Bleed (running ink) between the yellow and black inks was visually evaluated according to the following criteria. The print conditions included a recording density of 360 dpi and one-pass printing.

[Evaluation Criteria]
A: no bleed is observed and clearly black letters appear;
B: slight bleed is observed and black letters have slightly running ink; and
C: Bleed occurs and it is difficult to recognize black letters.

TABLE 3

| | Discharge Stability | Bleeding |
|---|---|---|
| Example A-1 | A | A |
| Example A-2 | A | A |
| Example A-3 | A | A |
| Example A-4 | A | A |
| Example A-5 | A | A |
| Example A-6 | A | A |
| Example A-7 | A | A |
| Example A-8 | A | A |
| Example A-9 | A | A |
| Example A-10 | A | A |
| Example A-11 | A | A |
| Example A-12 | A | A |
| Example A-13 | A | A |
| Example A-14 | A | A |
| Example A-15 | A | A |
| Example A-16 | A | A |
| Example A-17 | A | A |
| Comp. Ex. A-1 | C | C |
| Comp. Ex. A-2 | D | C |
| Comp. Ex. A-3 | B | B |
| Comp. Ex. A-4 | C | C |

Example B-1

—Preparation of Yellow Pigment Ink—

A yellow pigment was prepared by treating C.I. Pigment Yellow 128 at low temperature plasma to introduce a carboxylic acid group. This yellow pigment was dispersed in deionized water and de-mineralized and concentrated by ultra-filtration membrane to obtain a yellow pigment dispersion having a pigment concentration of 15% by mass.

The following ink composition was mixed and stirred and filtered by a polypropylene filter having an average pore diameter of 0.8 μm to prepare an ink.

<Ink Composition>

The above yellow pigment dispersion . . . 40 parts by mass;
diethylene glycol . . . 20 parts by mass;
glycerin . . . 10 parts by mass;
fluorochemical surfactant (FS-300, by DuPont Kabushiki Kaisha) . . . 1.5 parts by mass;

where, j is 6 to 8, k is 26 or more;
2-amino-2-methyl-1,3-propanediol . . . 0.6 parts by mass;
Proxel LV (by Abesia Co., Ltd.) . . . 0.2 parts by mass; and
deionized water . . . 28.7 parts by mass.

Example B-2

—Preparation of Magenta Pigment Ink—

A magenta pigment was prepared by treating C.I. Pigment Magenta 122 at low temperature plasma to introduce a carboxylic acid group. This magenta pigment was dispersed in deionized water and de-mineralized and concentrated by ultra-filtration membrane to obtain a magenta pigment dispersion having a pigment concentration of 15% by mass.

The following ink composition was mixed and stirred and filtered by a polypropylene filter having an average pore diameter of 0.8 μm to prepare an ink.

<Ink Composition>

The above magenta pigment dispersion . . . 40 parts by mass;
diethylene glycol . . . 20 parts by mass;
glycerin . . . 10 parts by mass;
fluorochemical surfactant having the following Structural formula . . . 1 part by mass;

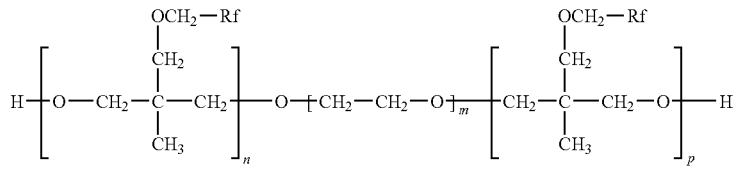

where, n=4, m=21, p=4, and Rf=$CF_2CF_3$;
1-methylamino-2,3-propanediol . . . 0.4 parts by mass;
Proxel LV (by Abesia Co., Ltd.) . . . 0.5 parts by mass; and
deionized water . . . 28.1 parts by mass.

Example B-3

—Preparation of Cyen Polymer Fine-particles Dispersion—

A copper phthalocyanine pigment-containing polymer fine-particles dispersion was prepared with reference to Preparation Example 3 of Japanese Patent Application Laid-Open (JP-A) No. 2001-139849.

First, for preparing a polymer solution, the inside of a 1L flask equipped with a mechanical stirrer, a thermometer, a nitrogen gas inlet tube, a reflux tube, and a dropping funnel was sufficiently purged with nitrogen gas. Then, 11.2 g of styrene, 2.8 g of acrylic acid, 12.0 g of laurylmethacrylate, 4.0 g of polyethylene glycol methacrylate, 4.0 g of styrene macromer (by To a Gosei Co., Ltd., trade name: AS-6), and 0.4 g of mercaptoethanol were introduced and heated to 65° C. A mixed solution of 100.8 g of styrene, 25.2 g of acrylic acid, 108.0 g of layrylmethacrylate, 36.0 g of polyethylene glycol methacrylate, 60.0 g of hydroxyethylmethacrylate, 36.0 g of styrene macromer (by To a Gosei Co., Ltd., trade name: AS-6), 3.6 g of mercaptoethanol, 2.4 g of azobisdimethylvaleronitrile, and 18 g of methylethylketone was added in drops to the flask over 2.5 hours. After the dropping, a mixed solution of 0.8 g of azobisdimethylvaleronitrile and 18 g of methylethylketone was added in drops to the flask over 0.5 hour and allowed to mature at 65° C. for one hour. 0.8 g of azobisdimethylvaleronitrile was added and allowed to mature for another one hour. After the reaction completed, 364 g of methylethylketone was added to the flask to obtain 800 g of a polymer solution having a concentration of 50% by mass.

Twenty-eight grams (28 g) of the obtained polymer solution, 26 g of copper phthalocyanine pigment, 13.6 g of 1 mol/L aqueous potassium hydroxide, 20 g of methylethylketone, and 30 g of deionized water were well stirred and, then, kneaded with a triple roll mill (by Noritake Company, trade name: NR-84A) 20 times. The obtained paste was introduced in 200 g of deionized water and well stirred. The methylethylketone and water were distilled away using an evaporator to obtain 160 g of a cyan polymer fine-particles dispersion having a solid content of 20.0% by mass.

—Preparation of Cyan Pigment Ink—

Using the obtained cyan polymer fine-particle dispersion, the following composition was mixed and stirred and filtered by a polypropylene filter having an average pore diameter of 0.8 μm to prepare an ink.

<Ink Composition>

The above cyan polymer fine-particle dispersion . . . 45 parts by mass;
1,3-butanediol . . . 21 parts by mass;
glycerin . . . 8.0 parts by mass;
fluorochemical surfactant (FNS-100, by DuPont Kabushiki Kaisha) . . . 1% by mass;

$CF_3CF_2(CF_2CF_2)_j$—$CH_2CH_2O$—$(CH_2CH_2O)_kH$ where, j is 1 to 9, k is 0 to 25;
2-amino-2-methyl-1,3-propanediol . . . 0.8 parts by mass;
Proxel LV (by Abesia Co., Ltd.) . . . 0.5 parts by mass; and
deionized water . . . 21.7 parts by mass.

Example B-4

—Preparation of Cyan Pigment Ink—

The ink of Example B-4 was prepared in the same manner as in Example B-3 except that 0.08 parts by mass of 2-amino-2-ethyl-1,3-propanediol and 24.7 parts by mass of deionized water were used.

Example B-5

—reparation of Cyan Pigment Ink—

The ink of Example B-5 was prepared in the same manner as in Example B-3 except that 3.0 parts by mass of 2-amino-2-ethyl-1,3-propanediol and 23.7 parts by mass of deionized water were used.

Comparative Example B-1

—Preparation of Yellow Pigment Ink—

The ink of Comparative Example B-1 was prepared in the same manner as in Example B-1 except that no 2-amino-2-ethyl-1,3-propanediol was used.

Comparative Example B-2

—Preparation of Yellow Pigment Ink—
The ink of Comparative Example B-2 was prepared in the same manner as in Example B-1 except that 0.1 parts by mass of benzotriazole was used in place of 0.6 parts by mass of 2-amino-2-ethyl-1,3-propanediol.

Comparative Example B-3

—Preparation of Magenta Pigment Ink—
The ink of Comparative Example B-3 was prepared in the same manner as in Example B-2 except that no 1-methylamino-2,3-propanediol were not used.

Comparative Example B-4

—Preparation of Magenta Pigment Ink—
The ink of Comparative Example B-4 was prepared in the same manner as in Example B-2 except that no fluorochemical surfactant was used.

Comparative Example B-5

—Preparation of Cyan Pigment Ink—
The ink of Comparative Example B-5 was prepared in the same manner as in Example B-3 except that no 2-amino-2-ethyl-1,3-propanedio was used.

Comparative Example B-6

—Preparation of Cyan Pigment Ink—
The ink of Comparative Example B-6 was prepared in the same manner as in Example B-3 except that no fluorochemical surfactant FSN-100 was used.

The obtained inks were evaluated for properties as follows. The results are shown in Table 4.

<Printer Used>
The inkjet printer shown in FIGS. 3 to 5 (by Ricoh Company, Ltd., IPSiO G707) was used.

A silicone resin (by Toray Dow Corning Silicone Co., Ltd, SR2316) was applied on the discharging surface of the inkjet printer nozzle head portion by spraying to a thickness of approximately 1.0 µm to form an ink-repellent layer. While the ink-repellent layer was formed, the nozzle and nozzle plate back surface were masked with a water-soluble resin. After the silicone resin layer was applied, the water-soluble resin film used as a mask was peeled off.

<Color Development (Color Saturation)>
My Paper (by NBS Ricoh Company, Ltd.) was used as the evaluation paper for each ink. The printing conditions included a printing density of 360 dpi and one-pass printing. The print pattern included 100% duty printing.

After drying, the solid color image parts were measured by a reflection color spectral colorimetry densitometer (by X-Rite K.K.) to obtain coordinates on the L*a*b* color system for the color difference indication defined by CIE (Commision International de l'Eclairage). The color saturation C* was obtained for each color. Higher color saturation values C* indicate better color development. The color saturation C* is defined by the following Equation 1:

$$C^* = \{(a^*)^2 + (b^*)^2\}^{1/2} \quad \text{Equation 1}$$

<Evaluation of Discharge Stability after Continuous Printing>
A chart containing 5% print area in a total area of the paper within the image region was printed in each ink at 100% duty, a recording density of 360 dpi, and one-pass printing in 10-minute continuous operation. Then, the solid parts were visually evaluated for the presence of streaking, white spots, and disturbed jet according to the following criteria.

[Evaluation Criteria]
A: no streaking, white spots, or disturbed jet in the solid parts;
B: slight streaking, white spots, or disturbed jet is observed in the solid parts;
C: streaking, white spots, or disturbed jet is observed in the first scan; and
D: streaking, white spots, or disturbed jet is observed throughout the solid parts.

<Evaluation of Discharge Stability>
The 10-minute continuous operation was conducted for each ink under the same conditions as the discharge stability evaluation after continuous printing. A moisture retention cap was placed with the ink remaining adhered to the head surface and the printer was allowed to stand at 50° C. and 60% RH for one month. Then, the printer was cleaned to recover the same condition as before the standing. Then, an intermittent printing test was conducted under the following conditions to evaluate discharge stability. The following print pattern chart was continuously printed on 20 sheets of paper and, then, the printing was paused for 20 minutes. This operation was repeated 50 times. After a total of 1000 printings, the chart was printed one more time and visually evaluated for the presence of streaking, white spots, and disturbed jet according to the following criteria.

The print pattern chart containing 5% print area in a total area of the paper within the image region was printed at 100% duty in each ink. The print conditions included a recording density of 360 dpi and one-pass printing.

[Evaluation Criteria]
A: no streaking, white spots, or disturbed jet in the solid parts;
B: slight streaking, white spots, or disturbed jet is observed in the solid parts;
C: streaking, white spots, or disturbed jet is observed in the first scan; and
D: streaking, white spots, or disturbed jet is observed throughout the solid parts.

TABLE 4

|  | Color development | Discharge Stability | Discharge Stability after standing |
|---|---|---|---|
| Example B-1 | 82.4 (Y) | A | A |
| Example B-2 | 61.1 (M) | A | B |
| Example B-3 | 51.5 (C) | A | A |
| Example B-4 | 51.5 (C) | A | B |
| Example B-5 | 51.2 (C) | B | B |
| Comp. Ex. B-1 | 82.4 (Y) | B | D |
| Comp. Ex. B-2 | 82.3 (Y) | B | C |
| Comp. Ex. B-3 | 61.0 (M) | B | D |
| Comp. Ex. B-4 | 56.7 (M) | B | C |
| Comp. Ex. B-5 | 51.5 (C) | B | D |
| Comp. Ex. B-6 | 49.1 (C) | B | C |

* color development in parenthesis ( ) shows ink color.

From the results in Table 4, Examples B-1 to B-5 yielded excellent color development, discharge stability, and discharge stability after standing compared with Comparative Example B-1 to B-6. Particularly excellent discharge stability after standing was obtained. There was no silicone resin eluting from the nozzle head ink-repellent layer; therefore, no reduced or uneven ink-repellency was observed. Consequently, discharge stability was not deteriorated during the intermittent printing.

INDUSTRIAL APPLICABILITY

The recording ink of the present invention achieves improved color development, highly stable discharge, and excellently uniform solid image parts, thereby high quality images can be formed, and is preferably used in the ink cartridge, ink record, inkjet recording apparatus, and inkjet recording method.

The inkjet recording apparatus and inkjet recording method of the present invention are applicable to various recording in an inkjet recording system. For example, the inkjet recording apparatus and inkjet recording method of the present invention can be particularly preferably applied to inkjet recording printers, facsimiles, copy machines, and printer/fax/copy complex machines.

The invention claimed is:

1. A recording ink comprising:
water,
a water-soluble organic solvent,
a colorant, and
at least one fluorochemical surfactant selected from the following Structural Formulae (1) to (3):

Structural Formula (1)

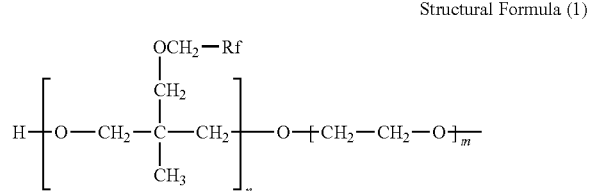

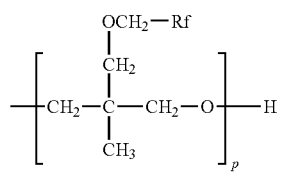

where, Rf is a fluorine-containing group; and m, n, and p are integers in the Structural Formula (1);

Structural Formula (2)

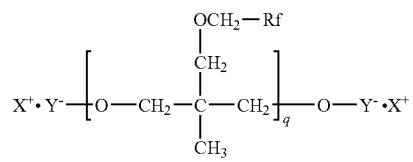

where, Rf is a fluorine-containing group; X is a cationic group; Y is an anionic group; and q is an integer in the Structural Formula (2); and Structural Formula (3)

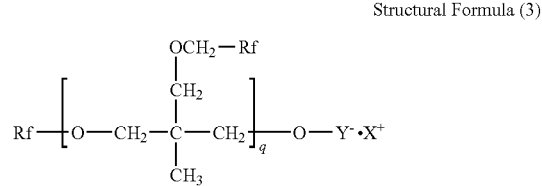

where, Rf is a fluorine-containing group; X is a cationic group; Y is an anionic group; and q is an integer in the Structural Formula (3).

2. The recording ink according to claim 1, wherein Rf in the Structural Formulae (1) to (3) is a perfluoroalkyl group.

3. The recording ink according to claim 1, wherein the fluorochemical surfactant is at least one selected from the following Structural Formulae (1-1) to (3-1):

Structural Formula (1-1)

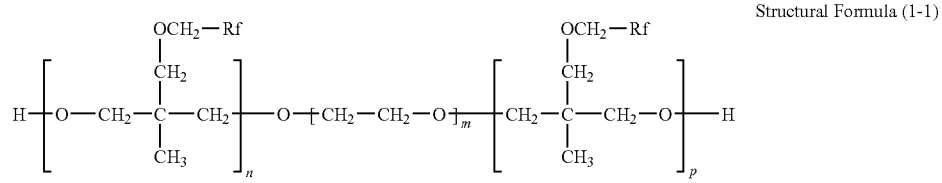

where, Rf is $CF_3$ or $CF_2CF_3$; and n is 1 to 4, m is 6 to 25, and p is 1 to 4;

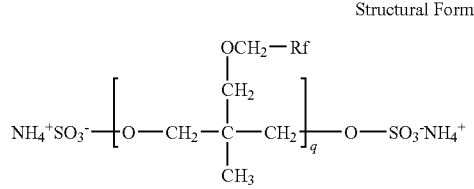

Structural Formula (2-1)

where, Rf is $CF_3$ or $CF_2CF_3$; and q is 1 to 6; and

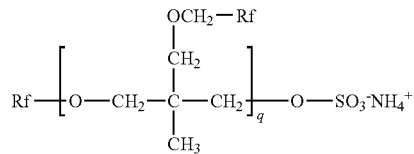

Structural Formula (3-1)

where, Rf is $CF_3$ or $CF_2CF_3$; and q is 1 to 6.

4. The recording ink according to claim 1, wherein the content of at least one fluorochemical surfactant selected from the Structural Formulae (1) to (3) is 0.01% by mass to 10% by mass.

5. The recording ink according to claim 1, wherein the colorant is at least one of pigments, dyes, and coloring fine-particles.

6. The recording ink according to claim 5, wherein the pigment comprises at least one hydrophilic group on the surface, and is at least one of water-dispersible and water-soluble in the absence of dispersant.

7. The recording ink according to claim 1, wherein the water-soluble organic solvent is at least one selected from glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone and N-hydroxyethyl-2-pyrrolidone.

8. The recording ink according to claim 1, comprising at least one selected from cyan ink, magenta ink, yellow ink, and black ink.

9. An ink cartridge comprising a container containing a recording ink,
wherein the recording ink comprises at least water, a water-soluble organic solvent, a colorant, and at least one fluorochemical surfactant selected from the following Structural Formulae (1) to (3):

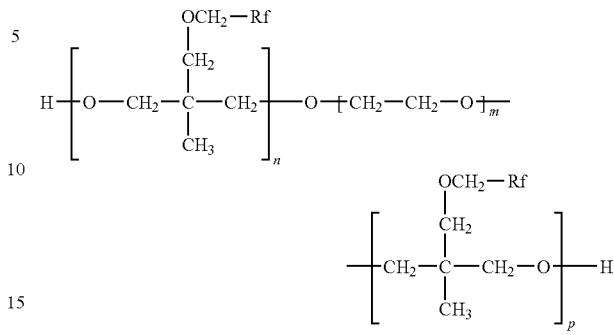

Structural Formula (1)

where, Rf is a fluorine-containing group; and m, n, and p are integers in the Structural Formula (1);

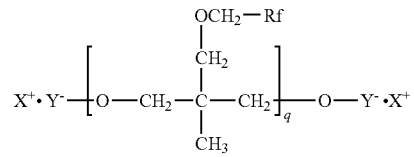

Structural Formula (2)

where, Rf is a fluorine-containing group; X is a cationic group; Y is an anionic group; and q is an integer in the Structural Formula (2); and

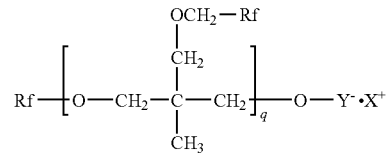

Structural Formula (3)

where, Rf is a fluorine-containing group; X is a cationic group; Y is an anionic group; and q is an integer in the Structural Formula (3).

10. An inkjet recording apparatus comprising:
an ink drops discharging unit configured to discharge a recording ink drop to form an image by applying an impulse to a recording ink,
wherein the recording ink comprises at least water, a water-soluble organic solvent, a colorant, and at least one fluorochemical surfactant selected from the following Structural Formulae (1) to (3):

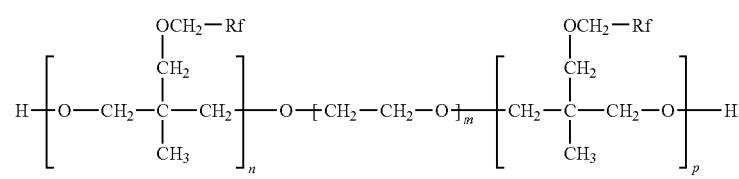

Structural Formula (1)

where, Rf is a fluorine-containing group; and m, n, and p are integers in the Structural Formula (1);

Structural Formula (2)

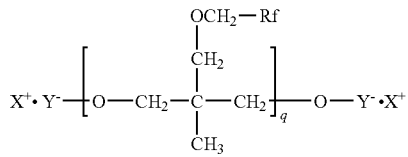

where, Rf is a fluorine-containing group; X is a cationic group; Y is an anionic group; and q is an integer in the Structural Formula (2); and Structural Formula (3)

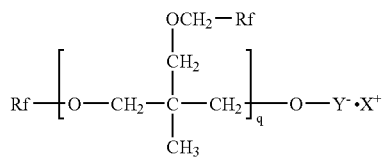

where, Rf is a fluorine-containing group; X is a cationic group; Y is an anionic group; and q is an integer in the Structural Formula (3).

11. An inkjet recording apparatus comprising:

an ink drops discharging unit configured to discharge a recording ink drop to form an image by applying an impulse to a recording ink, wherein the ink drops discharging unit comprises a nozzle head portion having a silicone resin-containing ink-repellent layer on the ink discharging surface, and wherein the ink used in the inkjet recording apparatus comprises at least water, a colorant, a fluorochemical surfactant, and an aminopropanediol compound;

wherein the fluorochemical surfactant is at least one selected from the following Structural Formulae (A), (1, (2) and (3):

$CF_3CF_2(CF_2CF_2)_j$—$CH_2CH_2O(CH_2CH_2O)_k H$ Structural Formula (A)

where, j is an integer of 6 to 8; and k is an integer of 26 or more in the Structural Formula (A);

where, Rf is a fluorine-containing group; and m, n, and p are integers in the Structural Formula (1 );

Structural Formula (2)

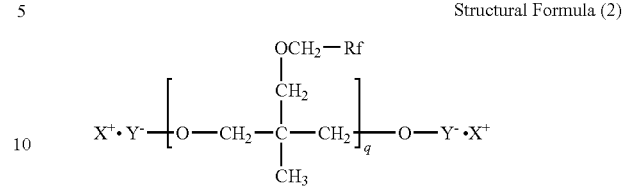

where, Rf is a fluorine-containing group; X is a cationic group; Y is an anionic group; and g is an integer in the Structural Formula (2); and Structural Formula (3)

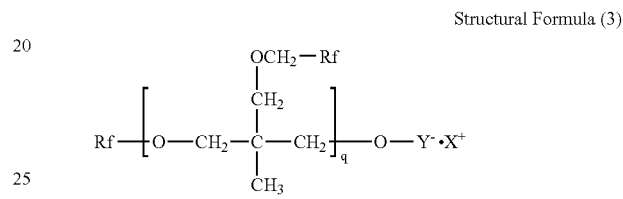

where, Rf is a fluorine-containing group; X is a cationic group; Y is an anionic group; and q is an integer in the Structural Formula (3).

12. The inkjet recording apparatus according to claim 11, wherein the aminopropanediol compound is 2-amino-2-ethyl-1,3-propanediol.

13. The inkjet recording apparatus according to claim 11, wherein the content of the aminopropanediol compound in the ink is 0.01% by mass to 10% by mass.

14. The inkjet recording apparatus according to claim 11, wherein the content of the fluorochemical surfactant in the ink is 0.05% by mass to 20% by mass.

15. The inkjet recording apparatus according to claim 11, wherein the colorant is at least one of pigments, dyes, and coloring fine-particles.

16. The inkjet recording apparatus according to claim 15, wherein the pigment comprises at least one hydrophilic group on the surface, and is at least one of water-dispersible and water-soluble in the absence of dispersant.

17. The inkjet recording apparatus according to claim 10, wherein the impulse is at least one selected from heat, pressure, vibration, and light.

18. An inkjet recording method comprising:

discharging a recording ink drop to form an image by applying an impulse to a recording ink, Structural Formula (1)

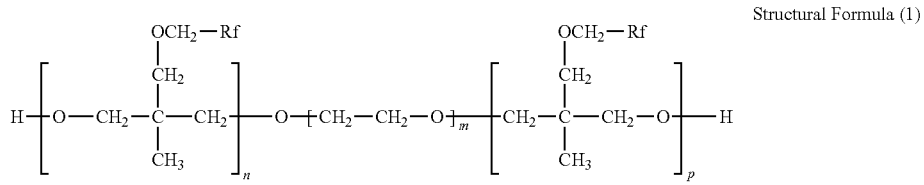

wherein the recording ink comprises at least water, a water-soluble organic solvent, a colorant, and at least one fluorochemical surfactant selected from the following Structural Formulae (1) to (3):

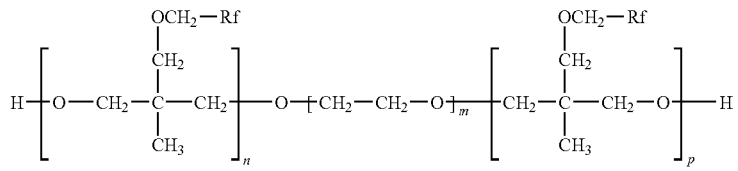

Structural Formula (1)

where, Rf is a fluorine-containing group; and m, n, and p are integers in the Structural Formula (1);

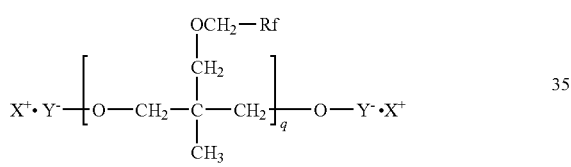

Structural Formula (2)

where, Rf is a fluorine-containing group; X is a cationic group; Y is an anionic group; and q is an integer in the Structural Formula (2); and

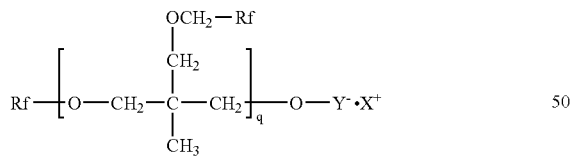

Structural Formula (3)

where, Rf is a fluorine-containing group; X is a cationic group; Y is an anionic group; and q is an integer in the Structural Formula (3).

19. An inkjet recording method comprising:
discharging a recording ink drop to form an image by applying an impulse to a recording ink,
wherein the ink discharging is performed by using a nozzle head portion having a silicone resin-containing ink-repellent layer on the ink discharging surface, and
wherein the ink comprises at least water, a colorant, a fluorochemical surfactant, and an aminopropanediol compound;

wherein the fluorochemical surfactant is at least one selected from the following Structural Formulae (A), (1), (2) and (3):

$CF_3CF_2(CF_2CF_2)_j—CH_2CH_2O(CH_2CH_2O)_kH$ Structural Formula (A)

where, j is an integer of 6 to 8; and k is an integer of 26 or more in the Structural Formula (A);

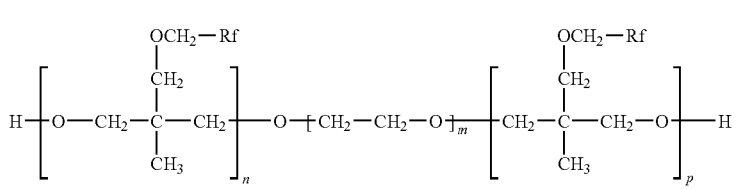

Structural Formula (1)

where, Rf is a fluorine-containing group; and m, n, and p are integers in the Structural Formula (1);

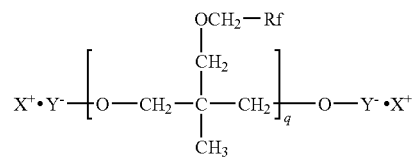

Structural Formula (2)

where, Rf is a fluorine-containing group; X is a cationic group; Y is an anionic group; and q is an integer in the Structural Formula (2); and

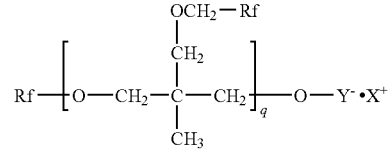

Structural Formula (3)

where, Rf is a fluorine-containing group; X is a cationic group; Y is an anionic group; and q is an integer in the Structural Formula (3).

20. The inkjet recording method according to claim 19, wherein the aminopropanediol compound is 2-amino-2-ethyl-1,3-propanediol.

21. The inkjet recording method according to claim 18, wherein the impulse is at least one selected from heat, pressure, vibration, and light.

22. An ink record comprising:
an image formed using a recording ink,
wherein the recording ink comprises at least water, a water-soluble organic solvent, a colorant, and at least one fluorochemical surfactant selected from the following Structural Formulae (1) to (3):

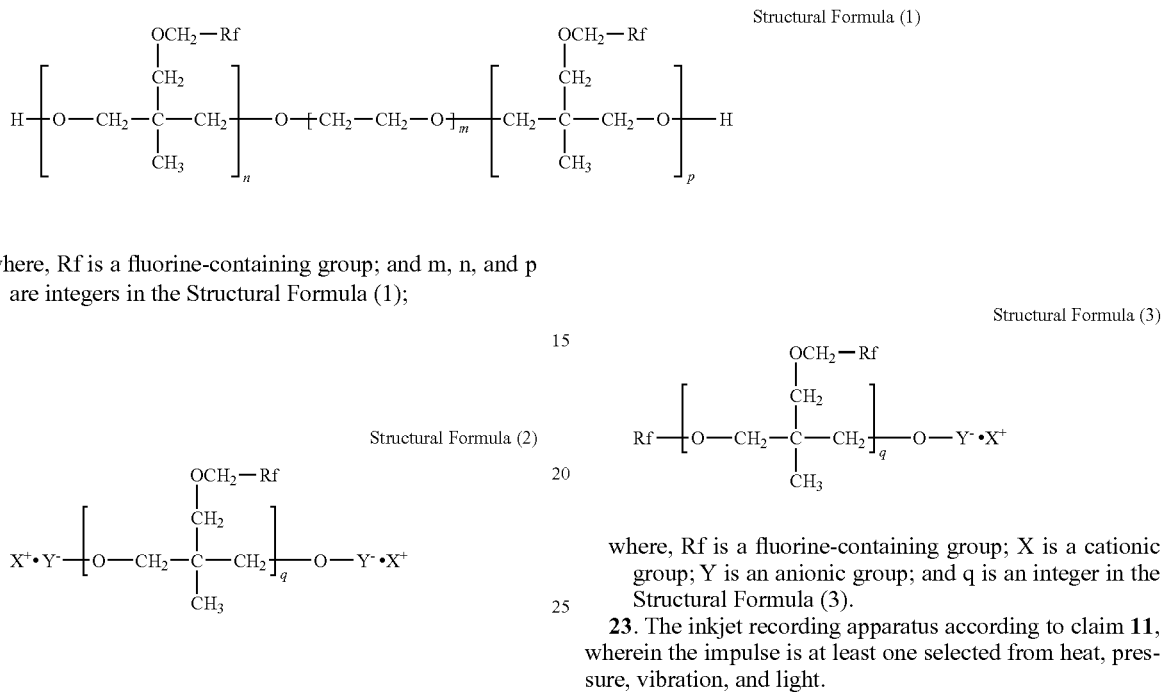

Structural Formula (1)

where, Rf is a fluorine-containing group; and m, n, and p are integers in the Structural Formula (1);

Structural Formula (2)

where, Rf is a fluorine-containing group; X is a cationic group; Y is an anionic group; and q is an integer in the Structural Formula (2); and Structural Formula (3)

where, Rf is a fluorine-containing group; X is a cationic group; Y is an anionic group; and q is an integer in the Structural Formula (3).

23. The inkjet recording apparatus according to claim 11, wherein the impulse is at least one selected from heat, pressure, vibration, and light.

24. The inkjet recording method according to claim 19, wherein the impulse is at least one selected from heat, pressure, vibration, and light.

* * * * *